US 11,472,070 B2

(12) United States Patent
Grando et al.

(10) Patent No.: US 11,472,070 B2
(45) Date of Patent: Oct. 18, 2022

(54) CONTINUOUS VULCANISATION PLANT

(71) Applicants: RF Systems S.R.L., Solagna (IT); Alessandro Grando, Romano d'ezzelino (IT)

(72) Inventors: Alessandro Grando, Romano d'ezzelino (IT); Patrizio Grando, Cismon del Grappa (IT)

(73) Assignees: RF Systems S.R.L., Solagna (IT); Alessandro Grando, Romano d'Ezzelino (IT)

( * ) Notice: Subject to any disclaimer, the term of this patent is extended or adjusted under 35 U.S.C. 154(b) by 223 days.

(21) Appl. No.: 16/770,267

(22) PCT Filed: Dec. 5, 2018

(86) PCT No.: PCT/IB2018/059670
§ 371 (c)(1),
(2) Date: Jun. 5, 2020

(87) PCT Pub. No.: WO2019/111178
PCT Pub. Date: Jun. 13, 2019

(65) Prior Publication Data
US 2020/0376721 A1 Dec. 3, 2020

(30) Foreign Application Priority Data
Dec. 7, 2017 (IT) .................. 102017000141761

(51) Int. Cl.
*B29C 35/10* (2006.01)
*B29C 31/00* (2006.01)
(Continued)

(52) U.S. Cl.
CPC ............ *B29C 35/10* (2013.01); *B29C 31/006* (2013.01); *B29C 35/0277* (2013.01);
(Continued)

(58) Field of Classification Search
CPC . B29C 35/10; B29C 35/0277; B29C 35/0805; B29C 44/20; B29C 44/367; B29C 44/58; B29C 2035/0861
See application file for complete search history.

(56) References Cited

U.S. PATENT DOCUMENTS

| 2,027,165 | A | 1/1936 | Grubman | |
| 2007/0228594 | A1* | 10/2007 | Villa | .................. B29C 33/0033 264/157 |
| 2008/0095877 | A1* | 4/2008 | Groenweghe | ........... B29C 33/36 425/351 |

FOREIGN PATENT DOCUMENTS

| EP | 1 025 972 A1 | 8/2000 |
| EP | 1 842 649 A2 | 10/2007 |

(Continued)

OTHER PUBLICATIONS

International Search Report and Written Opinion dated Mar. 22, 2019, issued in PCT Application No. PCT/IB2018/059670, filed Dec. 5, 2018.

*Primary Examiner* — Kelly M Gambetta
*Assistant Examiner* — Virak Nguon
(74) *Attorney, Agent, or Firm* — Workman Nydegger

(57) ABSTRACT

A plant for the continuous vulcanisation of mixtures of natural or synthetic latex inside a plurality of vulcanisation moulds aligned close to each other, each including: a base and a lid able to be removably coupled; an advancing mechanism for advancing the moulds along guides inside a vulcanising oven; and a sprayer for spraying the mixture inside the bases before entry into the vulcanising oven. The plant includes: an assembly set and a disassembly set of the moulds, belonging respectively to the input station and to the output station of the vulcanising oven; a first transport mechanism for transferring each base from the disassembly set to the assembly set; a second transport mechanism for (Continued)

transferring each lid from the disassembly set to the assembly set. The vulcanising oven includes a tunnel with a radiofrequency set for vulcanising the mixture.

18 Claims, 20 Drawing Sheets

(51) Int. Cl.
    *B29C 35/02*     (2006.01)
    *B29C 35/08*     (2006.01)
    *B29C 44/20*     (2006.01)
    *B29C 44/36*     (2006.01)
    *B29C 44/58*     (2006.01)
    *B29K 105/00*     (2006.01)

(52) U.S. Cl.
    CPC .......... *B29C 35/0805* (2013.01); *B29C 44/20* (2013.01); *B29C 44/367* (2013.01); *B29C 44/58* (2013.01); *B29C 2035/0861* (2013.01); *B29K 2105/0064* (2013.01)

(56) References Cited

FOREIGN PATENT DOCUMENTS

| | | |
|---|---|---|
| EP | 2 724 834 A1 | 4/2014 |
| WO | 2016/190874 A1 | 12/2016 |

\* cited by examiner

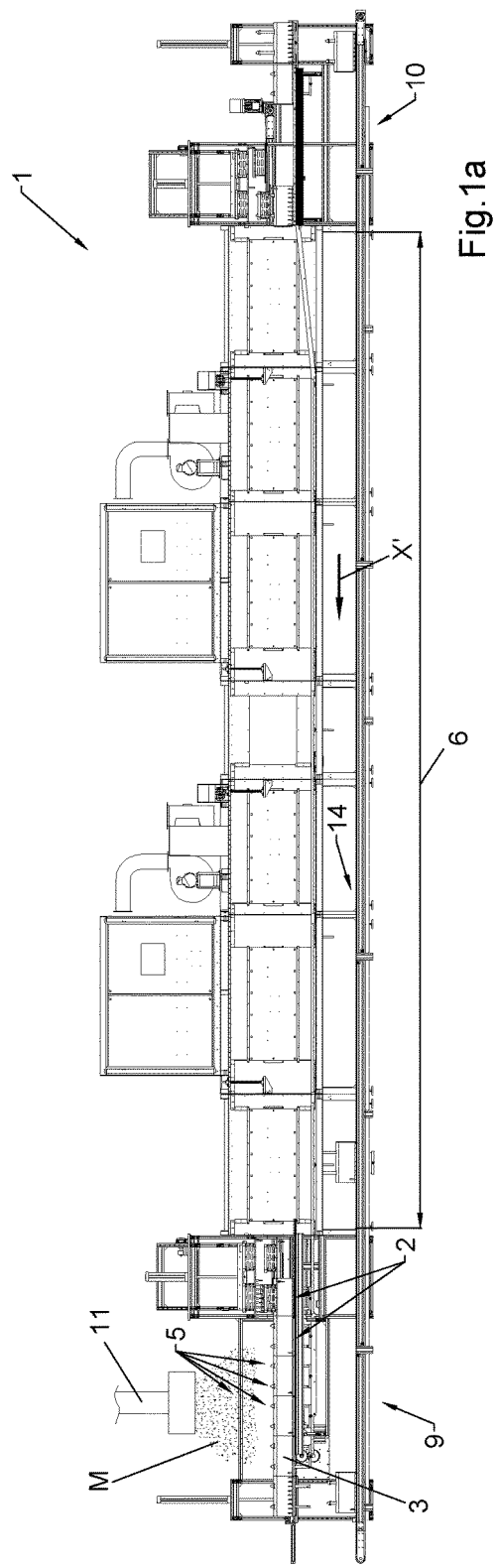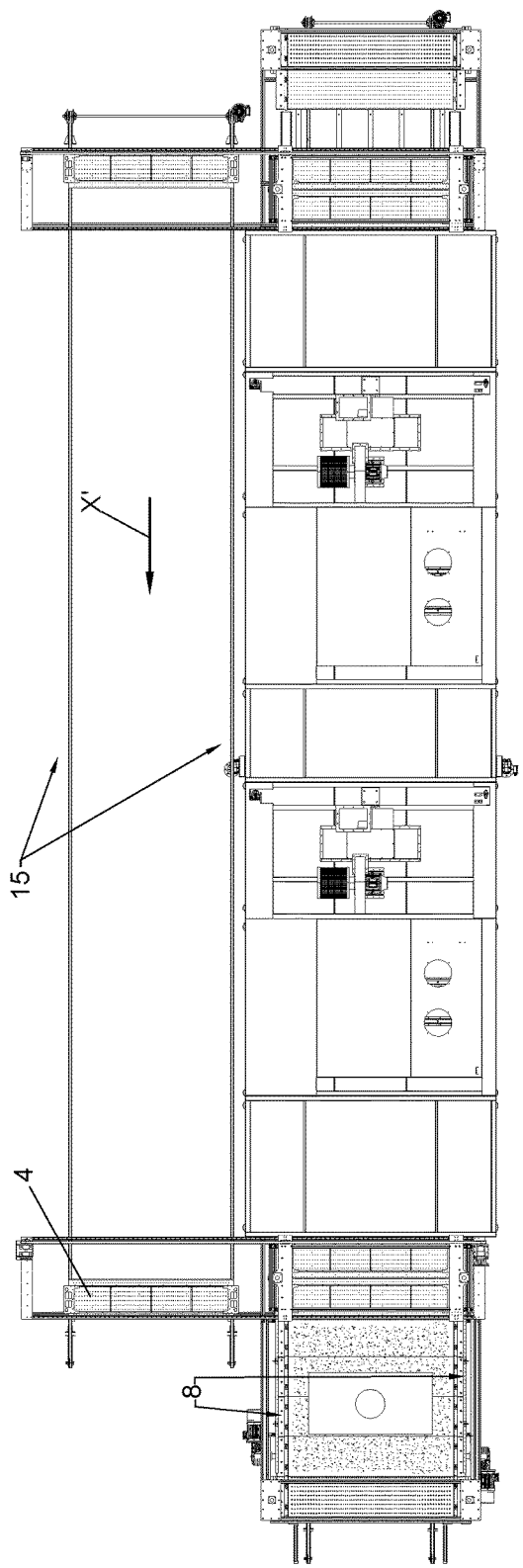

CONTINUOUS VULCANISATION PLANT

BACKGROUND OF THE INVENTION

1. The Field of the Invention

The invention relates to a continuous vulcanisation plant, particularly suited to vulcanise natural or synthetic latex.

2. The Relevant Technology

As is well known, vulcanisation is a process that, by means of heating, transforms natural or synthetic latex, which in the natural state is a dense liquid, into a material with spongy consistency suitable to manufacture objects of various kinds, preferably for furniture, such as pillows and mattresses The vulcanisation process comprises a preparatory phase in which the latex is mixed with appropriate additives until a dense foam is obtained, which is introduced in a vulcanisation mould.

The mould with the latex foam inside it is heated, obtaining the vulcanisation of the latex which assumes a stable configuration and an elastically yielding consistency, reproducing the inner shape of the mould.

In some cases, for example in the production of pillows and mattresses provided with a plurality of holes, these holes are obtained during vulcanisation by means of a plurality of cores projecting towards the interior of the mould, each of which is inserted in a seat obtained in one of the plates of the mould.

In particular, known plants are structured to produce continuous layers of vulcanised latex foam which after vulcanisation are cut to measure to prepare semi-finished elements suitable to obtain the finished products, for example pillows, mattresses or other kinds of manufactured articles.

It is known the patent document no. EP 1 842 649 which discloses a plant where top mould halves mounted on an upper conveyor are moved towards matching mould halves which are mounted on a lower conveyor.

A plant of the aforementioned type is described in the patent document EP 1 025 972 and comprises a tunnel vulcaniser along which advances a conveyor with chain structure which supports the material to be vulcanised positioned in appropriate containment shapes.

The containment shapes are positioned one after the other on an advancing structure that comprises two chains arranged side by side and wound in a loop on wheels positioned at the inlet and at the outlet of the tunnel vulcaniser.

When the containment shapes are positioned in the upper part of the chains, they are aligned one after the other and are positioned close to each other so as to define a continuous channel within which the vulcanisation of the latex takes place.

Upstream of the inlet of the tunnel vulcaniser, an injection set introduces the latex to be vulcanised at the start of the continuous channel defined by the containment shapes.

As it advances along the tunnel, the latex vulcanises and forms the continuous layer whose section is defined by the inner profile of the continuous channel formed by the mutually aligned containment shapes.

A first recognised drawback of the plant briefly described above is that the vulcanisation of the latex takes place by steam heating and this entails first of all the difficulty of vulcanising very thick material, and that heating is not uniformly distributed over the entire thickness of the material.

This entails the additional drawback that, if the material to be vulcanised is very thick, it is not vulcanised in the central region with consequent poor quality of the finished product.

Moreover, using steam for heating also entails high energy consumption and corresponding high production costs.

Another recognised drawback is the complexity of construction of the plant that stems from the need to build the whole part of the plant that pertains mainly to the structure for advancing the containment shapes so that no discontinuities are created between mutually contiguous containment shapes during the advance inside the tunnel.

It is indeed known that during vulcanisation the containment shapes, together with the structure that advances them, undergo heating that generates differentiated elongation because of the different lengths, thicknesses and type of material whereof the containment shapes and the advancing structure are made.

In addition, the progressive wear to which the advancing structure is subject due to the use also contributes to create, between mutually adjacent containment shapes, discontinuities in the longitudinal direction and in the transverse direction with reference to the direction of advance of the catenary.

Consequently, during their travel through the tunnel the containment shapes, not remaining stably adhering and aligned close to each other, are mutually distanced by variable quantities in the longitudinal and transverse direction.

During its advance along the tunnel, the latex, which is inserted in the discontinuities between the shapes, vulcanises in the same way as the latex contained in the shapes and, when vulcanisation is concluded, it constitutes a defect of the product that is manifested in the form of irregular projections present on its surface.

Obviously, this entails the additional drawback of a decline in the quality of the vulcanised product and consequently also poor qualitative reliability of the plant in terms of repetitiveness and qualitative consistency of the output product.

SUMMARY OF THE INVENTION

The present invention intends to provide a continuous vulcanisation plant that allows to eliminate the listed drawbacks.

It is a first purpose that the plant of the invention, with respect to equivalent known plants, has smaller size and less construction complexity.

Another purpose is that the plant also has higher reliability of operation.

An additional purpose is that the plant of the invention is so constructed that, during vulcanisation, no regions of discontinuity are created between the containment shapes that advance along the tunnel.

Another purpose is that the vulcanised product exiting the plant does not have surface defects or at least that any defects are far fewer than the defects noted on the product vulcanised in prior art plants and particularly in the plant of the cited patent document.

A further purpose is that the plant of the invention allows to obtain a vulcanised product of various thicknesses.

Yet another purpose is that the plant of the invention utilises heating means that, with respect to known means, are less costly both from the viewpoint of its construction and systems, and from the viewpoint of its operation.

Moreover, not the least purpose is that these heating means execute a qualitatively better, more uniform vulcanisation than prior art plants, particularly with respect to plants with steam heating.

The purposes listed above are achieved by an improved continuous vulcanisation plant that it constructed according to the content of the main claim and of the dependent claims to which reference will be made.

Advantageously, heating by radiofrequency allows more rapid and more uniform heating of the product to be vulcanised than heating carried out with other known means, for example by steam.

This allows to obtain vulcanisation plants whose length is 25% to 30% shorter than the length of prior art plants with steam heating.

Advantageously, the plant of the invention has such features that its construction and its operating reliability are better than equivalent prior art plants.

Also advantageously, the plant of the invention allows to obtain vulcanised products that are qualitatively better than the similar vulcanised products obtained with known plants.

This better quality is sought in the fact that the latex, before being introduced in the vulcanisation moulds, is subjected to a series of operations that treat it mechanically with the aid of chemical products so as to transform it into a mass with soft consistency due to the presence of dispersed air bubbles.

After introduction in the moulds, the air bubbles tend spontaneously and slowly to collapse and, if vulcanisation takes place over a long time, the latex progressively increases its density and a vulcanised product with low porosity, less elastic and poorly transpiring is obtained.

Advantageously, then, using radiofrequency heating that heats the product more rapidly and uniformly, the dispersed air bubbles do not collapse or collapse less rapidly and a less dense and hence more porous and transpiring product is obtained.

BRIEF DESCRIPTION OF THE DRAWINGS

The purposes and the advantages listed above are reached by the vulcanisation plant of the invention that is described below with reference to the accompanying drawings that are provided solely for non-limiting indication, in which:

FIGS. 1a and 1b show respectively the lateral view and the plan view of FIG. 1;

DETAILED DESCRIPTION OF THE PREFERRED EMBODIMENTS

Figure 1:
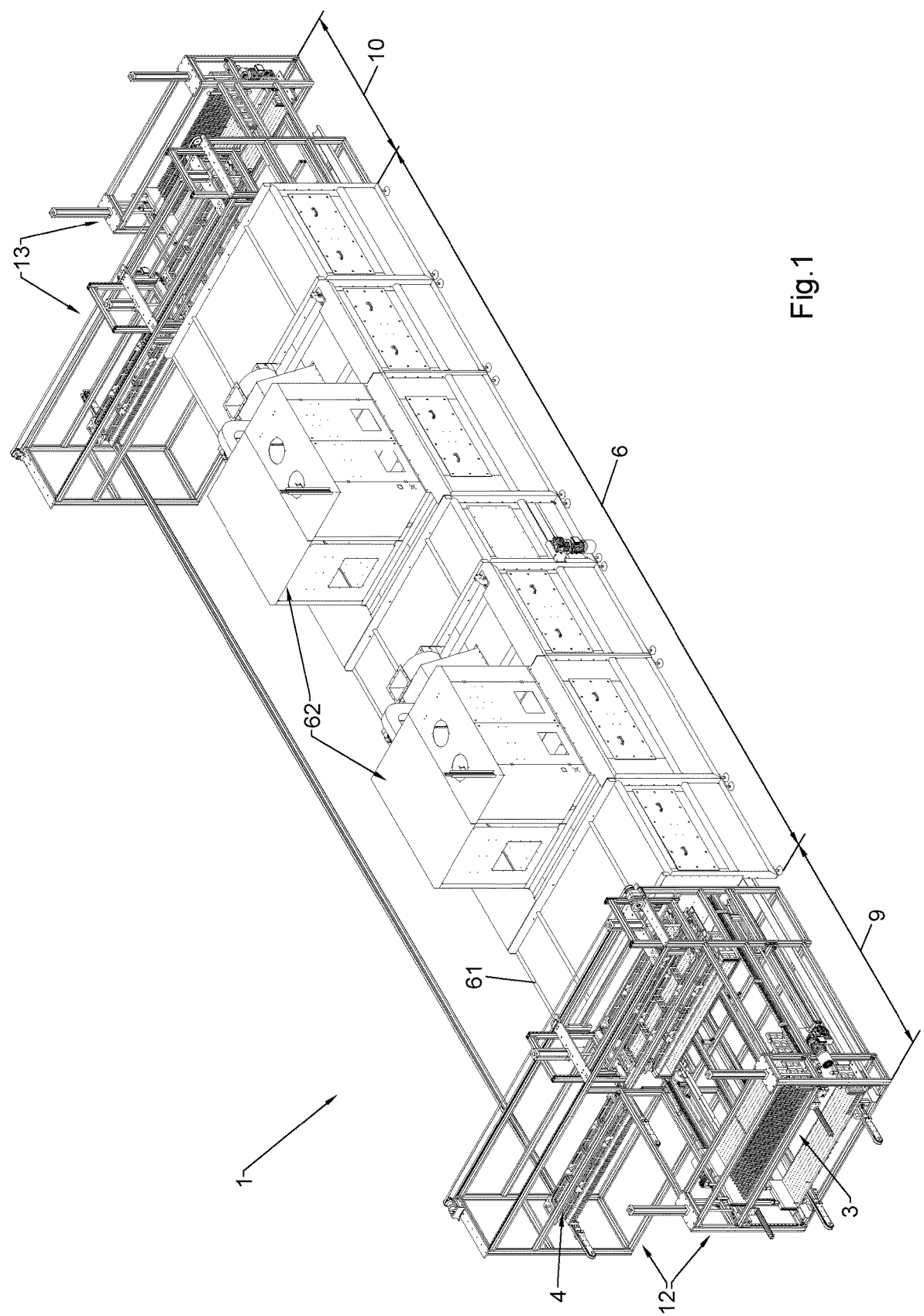
FIG. 1 is an axonometric view of the plant of the invention.

The continuous vulcanisation plant of the invention is represented in its entirety in an axonometric view in FIG. 1 and in the lateral plan views in FIGS. 1a and 1b, where it is globally designated with the numeral 1.

It is preferably used for the continuous vulcanisation of mixtures M of natural or synthetic latex contained inside appropriate moulds, but it can also be used for other purposes.

In particular, in FIGS. 1a and 1b it is observed that the plant 1 comprises a plurality of vulcanisation moulds 2 that are aligned close to each other and each comprises a base 3 and a lid 4 that are particularly observed in FIGS. 16 through 22 and that can be removably coupled to each other by junction means 5 to define in the mould 2 an annular profile 21 that receives the mixture M to be vulcanised.

The plant also comprises a vulcanising oven, designated in its entirety with the numeral 6, for the vulcanisation of the mixture M confined inside the aforesaid moulds 2, which oven is between an input station 9 positioned upstream and an output station 10 positioned downstream, between which extend guiding means 8 that identify the longitudinal direction of advance X of the bases 3 and of the moulds 2.

Figure 5:
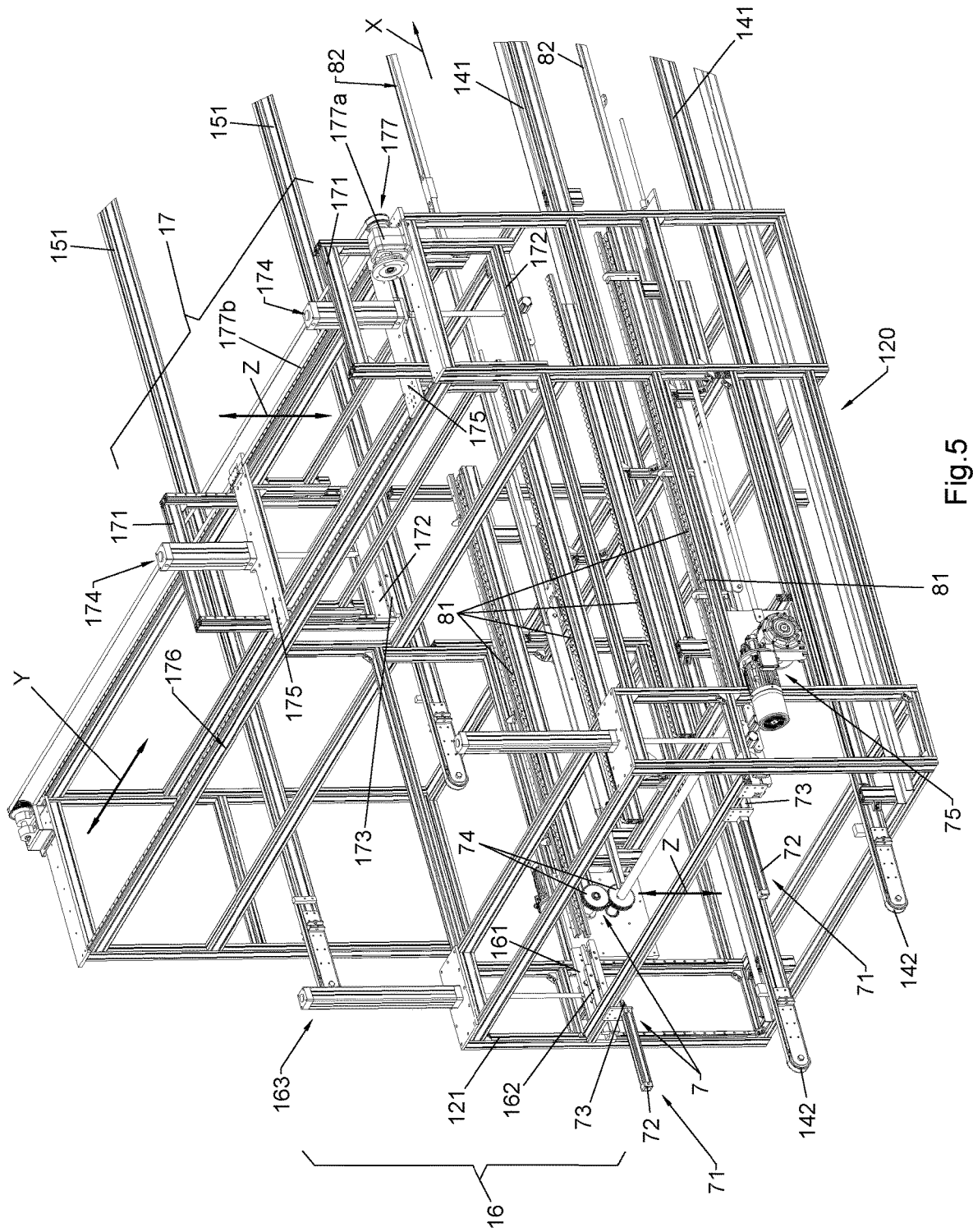

For the advance of the bases 3 and of the moulds 2 along the guiding means 8 from the input station 9 to the output station 10 are present advancing means 7 that are particularly visible in FIG. 5.

Also present are spraying means 11 for spraying the mixture M inside the bases 3 that are positioned in the input station 9 above the bases 3 before the respective lids 4 coupled therewith.

According to the invention and with particular reference to FIGS. 1 through 15, it is observed that the plant comprises:

- an assembly set 12 for assembling the moulds 2 that belongs to the input station 9 and is configured to connect each lid 4 to a corresponding base 3;
- a disassembly set 13 for disassembling the aforesaid moulds 2 that belongs to the output station 10 and is configured to separate each lid 4 from the corresponding base 3;
- first transport means 14 that are configured to transfer each of the bases 3 from the disassembly set 13 to the assembly set 12;
- second transport means 15 that are configured to transfer each of the lids 4 from the disassembly set 13 to the assembly set 12,
- wherein the vulcanising oven 6 is of the radiofrequency type and comprises a tunnel 61 having at least one radiofrequency set 62 for the vulcanisation of the mixture M contained inside the moulds 2.

The vulcanising oven 6 is of the radiofrequency type and allows to obtain all the known advantages connected with this heating method.

In particular, for example with respect to ovens that achieve vulcanisation by steam heating, vulcanisation with radiofrequency heating allows a better and more rigorous control of temperature and hence of the vulcanisation process obtaining a higher quality of the finished product.

Moreover, this vulcanisation takes place at lower temperature and the yellowing of the vulcanised product is avoided.

In addition, this vulcanisation allows to vulcanise large thicknesses that cannot be vulcanise or are difficult to vulcanise with steam heating.

Lastly, this vulcanisation allows to reduce plant costs and energy consumption.

Figure 4:
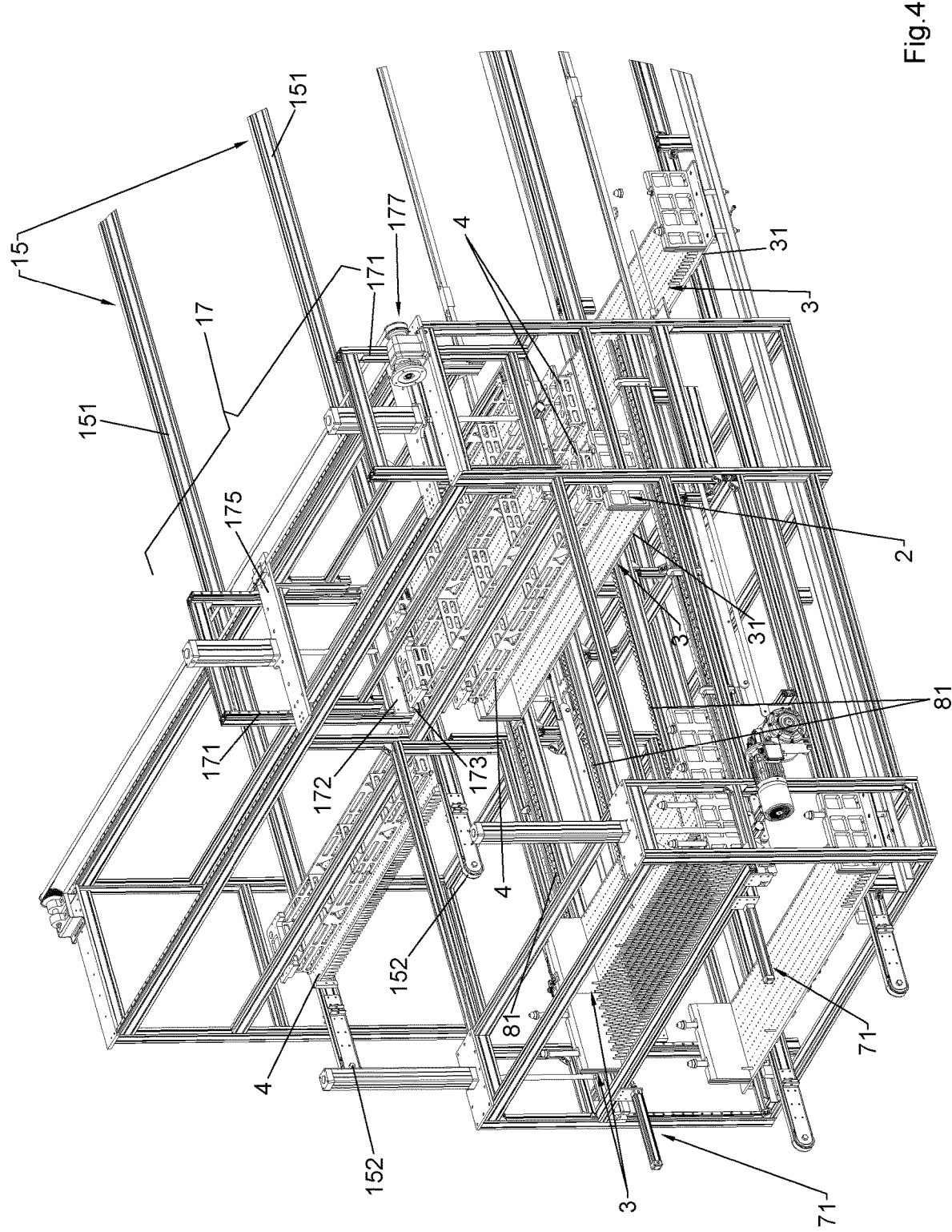
FIGS. 4 and 5 show enlarged details of the plant of FIG. 2.

Concerning the assembly set 12 it is observed, with particular reference to FIGS. 4 and 5, that it comprises a first frame 120 to which are associated first displacement means 16 that are configured to draw each of the bases 3 from the first transport means 14 and position it aligned to the guiding means 8, close to each other as is observed in FIGS. 1a, 1b, 6 and 10.

The assembly set 12 also comprises second displacement means 17 that are configured to draw each of the lids 4 from the second transport means 15 and to couple each to the underlying base 3 to assemble the mould 2.

The assembly set 12, as is observed in particular in FIG. 7, also comprises the aforementioned advancing means 7 for advancing the bases 3 and the moulds 2 along the aforementioned guiding means 8 which, as will be better described below, comprise planar lanes 81 and shaped lanes 82, mutually parallel, that are visible for example in FIG. 3.

With regard to the planar lanes 81, they run through the entire length of the plant and support the bases 3 and the moulds 2 along their path from the input station 9 to the output station 10 remaining parallel and on an upper plane with respect to the shaped lanes 82.

The planar lanes 81 facilitate the sliding of the moulds and for this purpose they may be provided with rolling means, for example rollers or balls, or they may be coated with anti-friction material of various types.

Merely to improve understanding of the figures and to simplify their representation, only the segments of the plane lanes 81 at the input station 9 and at the output station 10 are shown.

Lastly, it is observed that the first displacement means 16 are positioned upstream of the second displacement means 17 with reference to the direction of advance of the bases 3 and of the moulds 2 along the guiding means 8 which takes place according to the longitudinal direction indicated by the arrow X.

Figure 10:
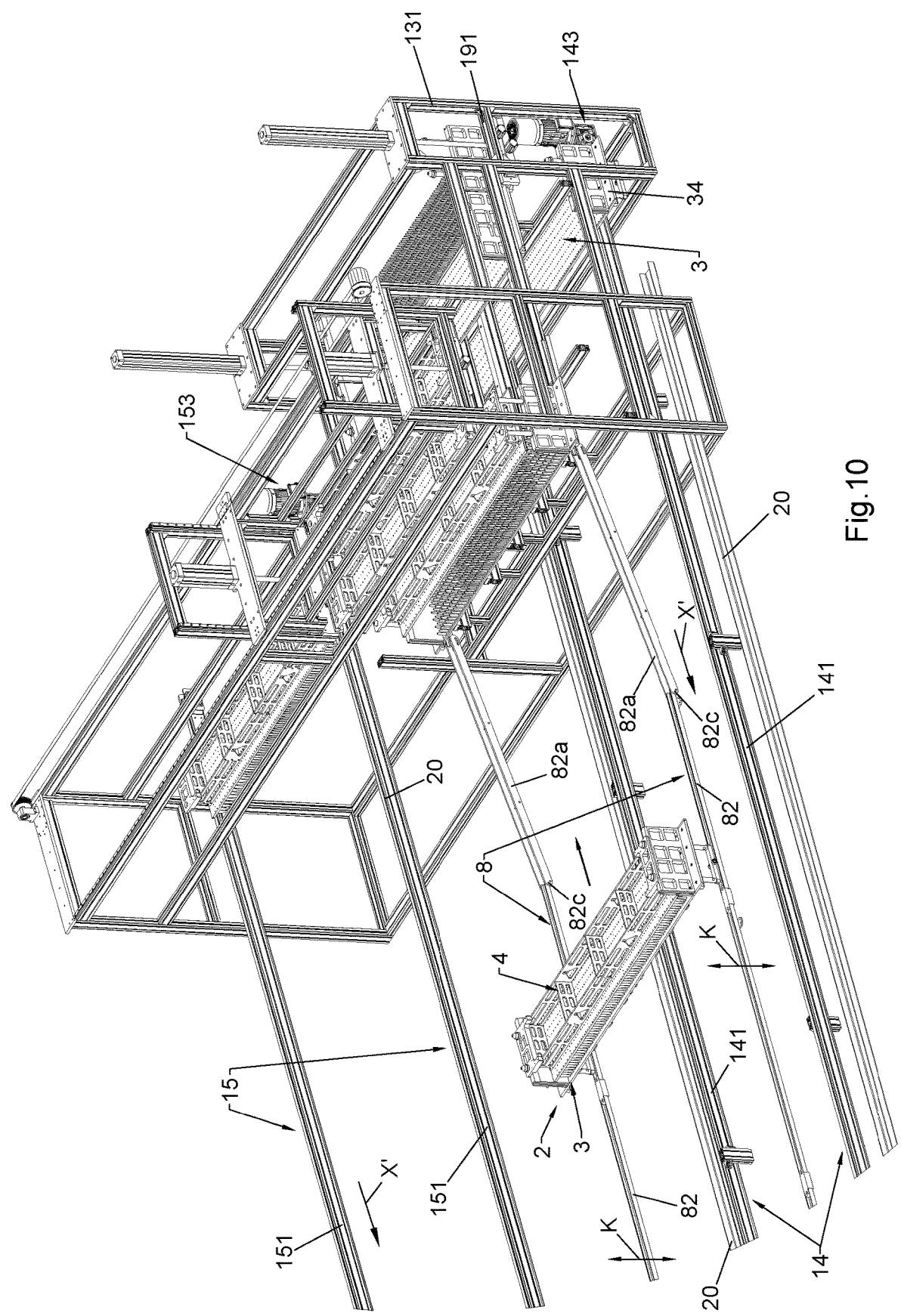
FIGS. 10 and 11 show an enlarged detail of FIG. 2.
Figure 11:
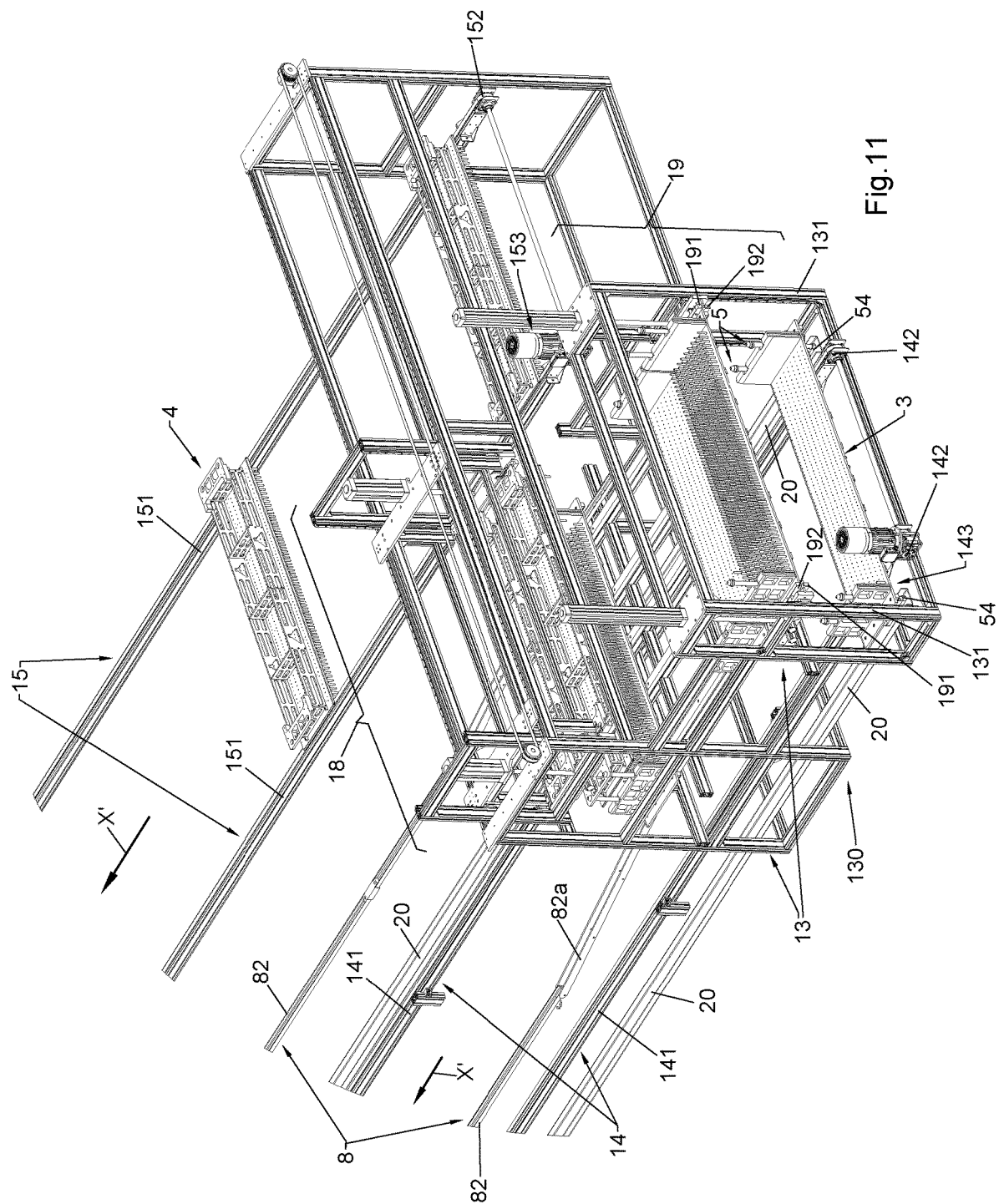
Figure 12:
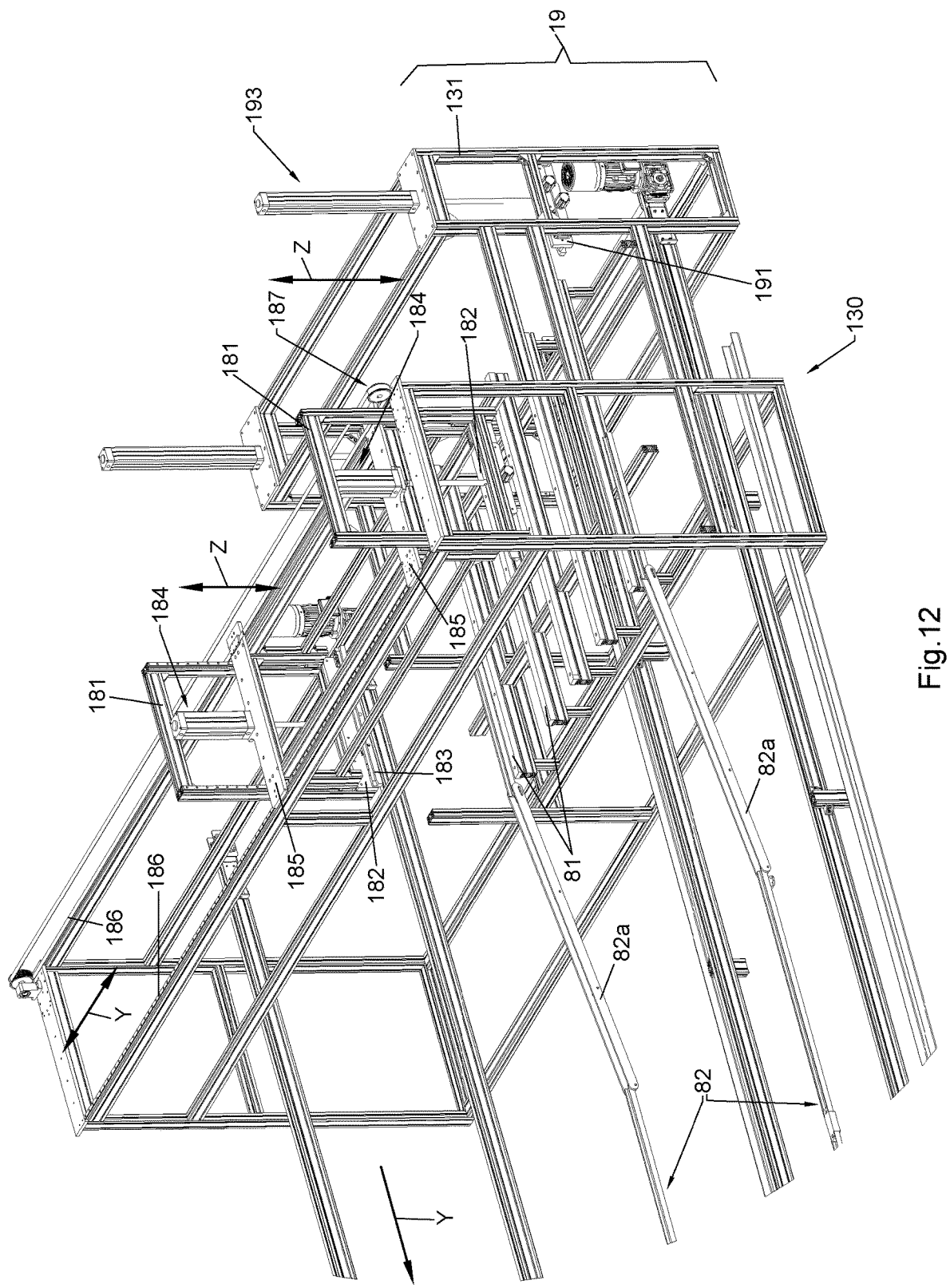
FIG. 12 is an enlarged detail of FIG. 10.
Figure 13:
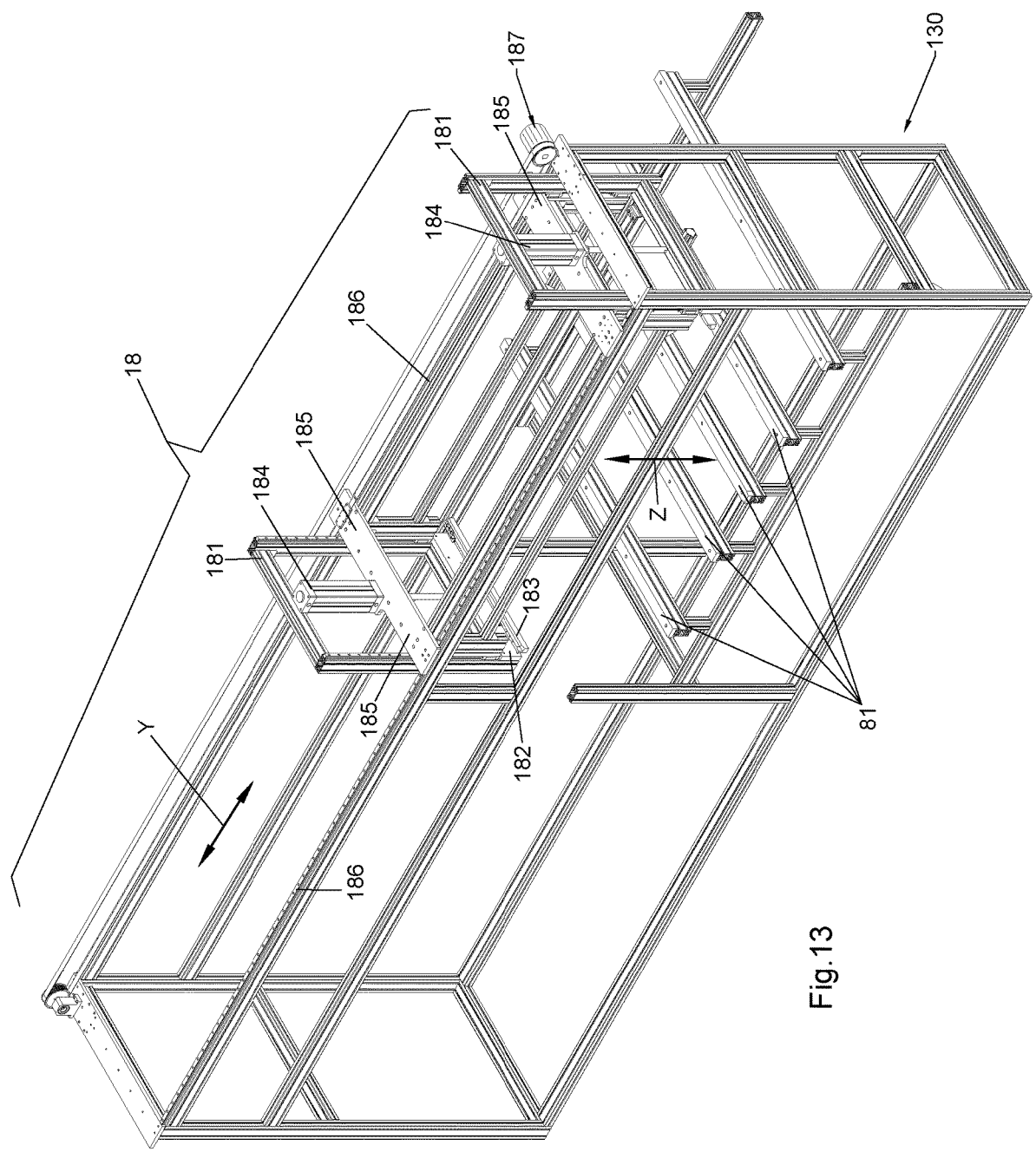
FIG. 13 is another enlarged detail of FIG. 10.
Figure 14:
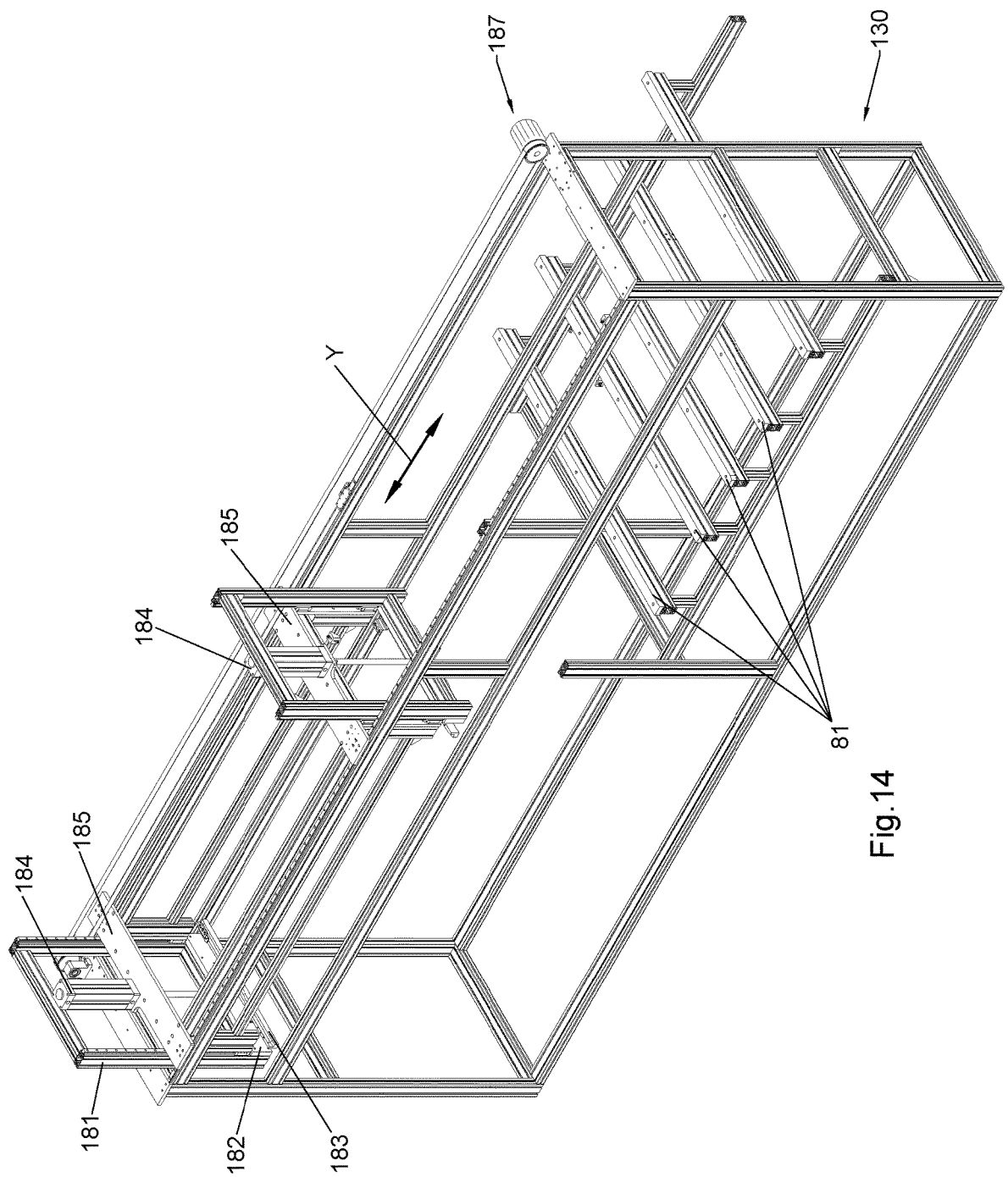
FIG. 14 shows the detail of FIG. 13 in a different operating configuration.

Concerning the disassembly set 13 it is observed, with particular reference to FIGS. 10 through 12, that it comprises a second frame 130 to which are associated third displacement means 18 that are configured to separate each of the lids 4 from the underlying base 3 and to position it on the aforesaid transport means 15.

The disassembly set 13 also comprises fourth displacement means 19 that are configured to draw each of the bases 3 from the guiding means 8 and position each base 3 on the underlying first transport means 14.

It is also observed that the fourth displacement means 19 are positioned downstream of the third displacement means 18 with reference to the direction of advance of the bases 3 and of the moulds 2 along the guiding means 8 which takes place according to the longitudinal direction indicated by the arrow X.

Figure 9:
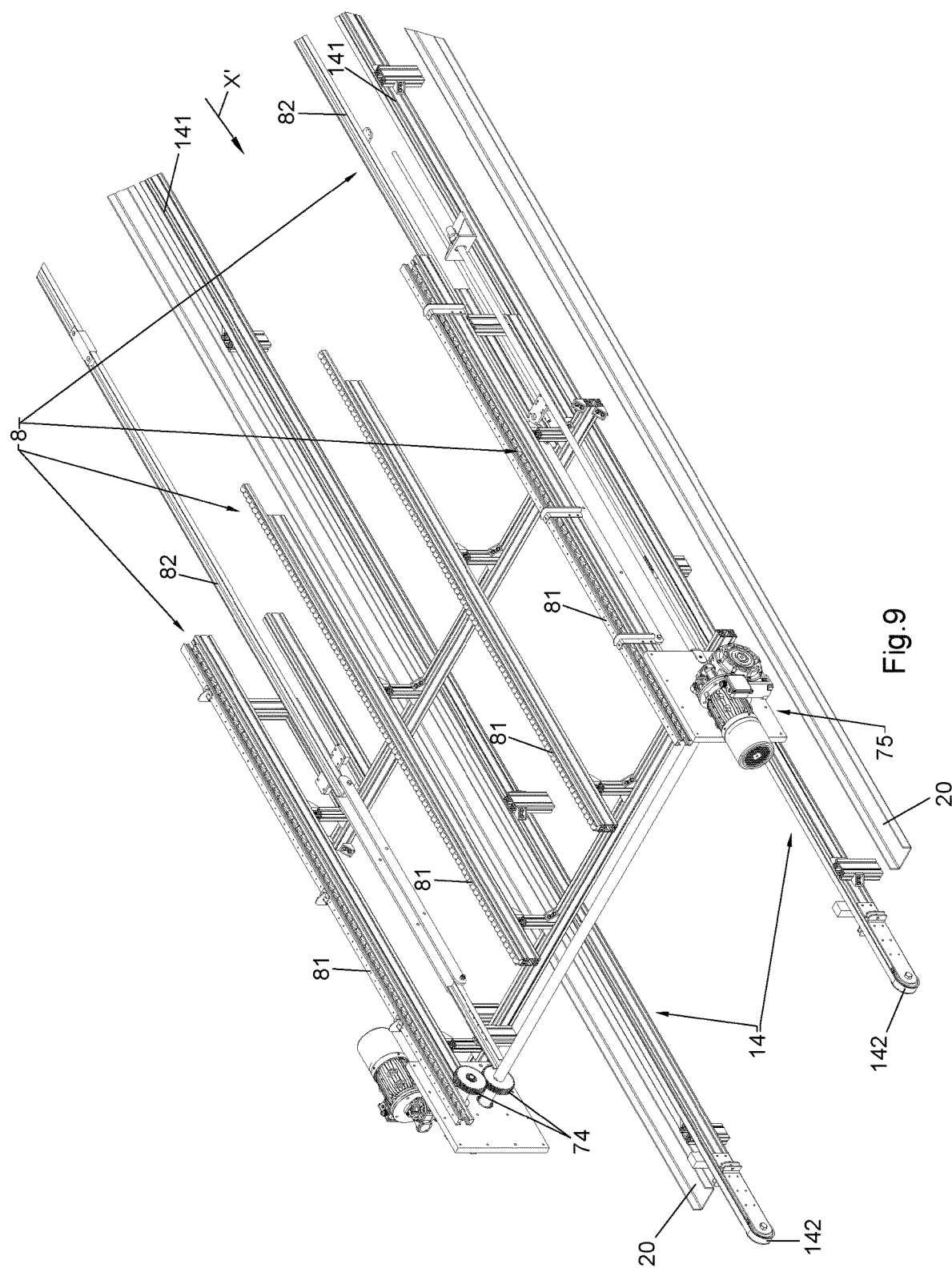
FIG. 9 is a detail of FIG. 5.

Concerning the guiding means 8, it is observed that they, as has already been stated, comprise planar lanes 81 and a pair of shaped lanes 82 that are mutually parallel and distanced and develop along the plant 1 from the input station 9 to the output station 10 lying on two mutually parallel planes, where the plane whereon the planar lanes 81 lie and develop is positioned above the plane whereon the shaped lanes 82 lie and develop as is observed, for example, in FIG. 9.

In particular, the planar lanes 81 slidably support the displacement of the bases 3 and of the moulds 2 from the input station 9 to the output station 10 while the underlying shaped lanes 82, as will be better described below, slidably support the junction means 5 positioned in the lower part of the rods 51.

When the advancing means 7 exercise a pushing action on the base 3 positioned at the head of the plurality of bases 3 aligned and close to each other, all the bases 3 and the moulds 2 positioned downstream advance in the longitudinal direction X supported by the planar lanes 81.

Figure 6:
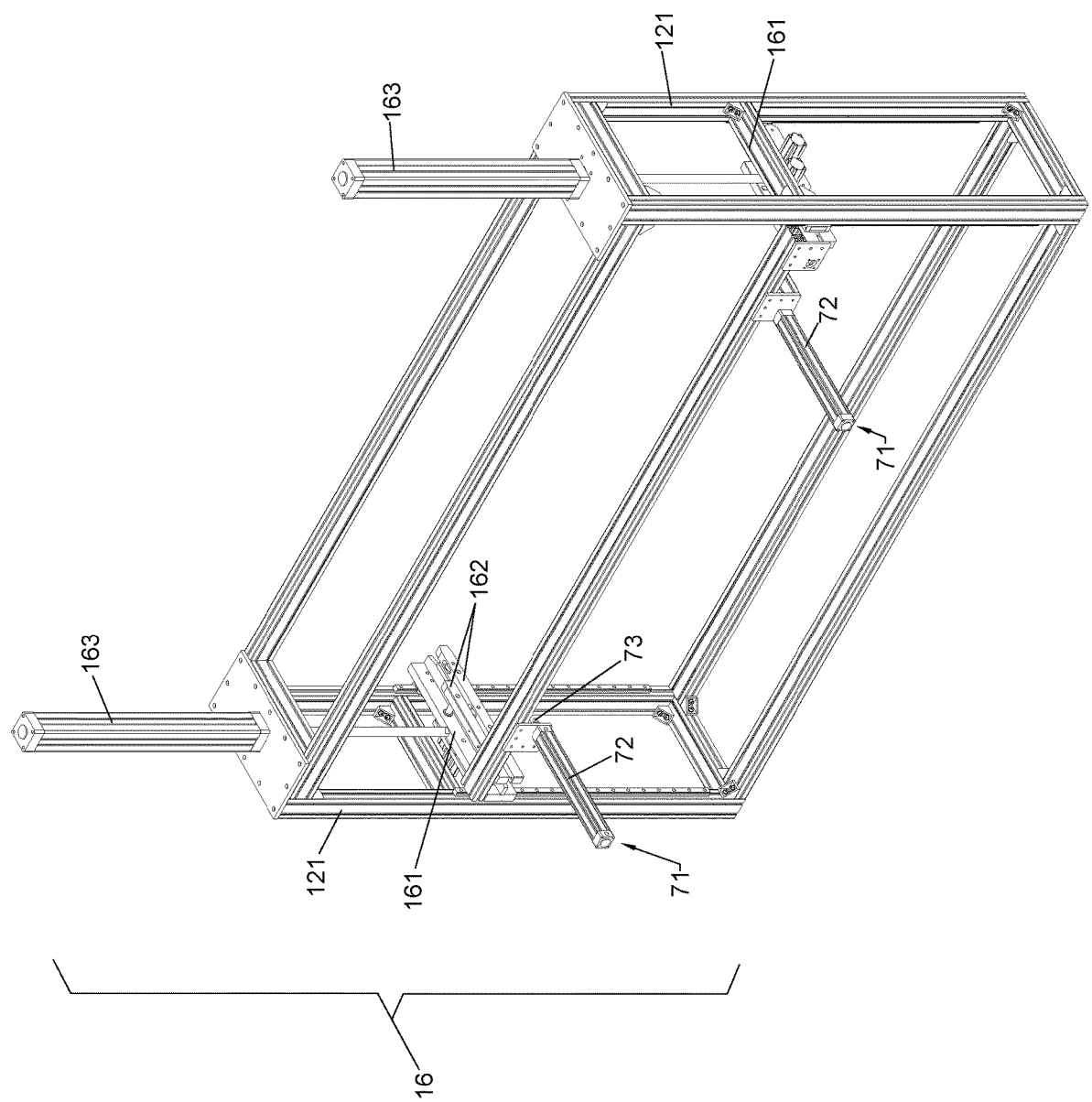
FIG. 6 is an enlarged detail of FIG. 5.

It is observed in fact, with particular reference to FIGS. 5, 6 and 9, that the advancing means 7 comprise a pair of linear actuators 71 that are supported by the first frame 120 at the first displacement means 16 and that are positioned upstream of the planar lanes 81.

Each linear actuator 71 comprises a cylinder 72 fixed to the frame 120 and having the end of the stem 73 configured to be placed in contact with a respective base 3 when the aforesaid base 3 is present at the first displacement means 16.

Moreover, the advancing means 7 also comprise a pair of gear wheels 74 that are positioned downstream of the linear actuators 71.

Each pair of gear wheels 74 is positioned at a respective planar lane 81 and it is set in rotation by motorisation means 75 fixed to the frame 120.

Lastly, the advancing means 7 also comprise a pair of racks 76 each of which is fixed below each base 3 to mesh with one of the gear wheels 74 when the linear actuators 71 move the base 3 towards the second displacement means 17 and place it on the planar lanes 81.

Concerning the first transport means 14 it is observed, in particular in FIGS. 5 and from 9 to 12, that they comprise a pair of first conveyor belts 141 that are mutually parallel, distanced and lying on a plane positioned inferiorly to the plane on which the guiding means 8 lie.

Each of the first conveyor belts 141 is wound in a loop between pulleys 142 that are set in rotation by motorisation means 143.

In particular, a pulley is positioned at the input station 9, as shown in FIGS. 4 and 5, and another pulley is positioned at the output station 10, as shown in FIG. 11.

The first conveyor belts 141, as shown in particular in FIGS. 10 and 11, are configured to receive in support the bases 3 when they are released by the disassembly set 13 and to transport them to the assembly set 12 according to the longitudinal direction designated by the arrow X' and hence in the opposite direction to the direction in which the moulds 2 advance towards the output station 10.

Concerning the second transport means 15 it is observed, in particular in FIGS. 4, 5 and from 10 to 12, that they comprise a pair of second conveyor belts 151 that are mutually parallel and distanced and lie on a plane positioned laterally and above the plane on which the guiding means 8 lie.

Each of the aforesaid conveyor belts 151 is wound in a loop between at least one pair of pulleys 152 that are set in rotation by motorisation means 153 and in which a pulley is positioned at the input station 9, as shown in FIGS. 4 and 5, and another one is positioned at the output station 10, as shown in FIG. 11.

The second conveyor belts 151 are configured to receive in support the lids 4 when they are released by the disassembly set 13, as shown in FIGS. 10 and 11, and to transport them to the assembly set 12 according to the longitudinal direction designated by the arrow X' and hence in the opposite direction to the direction in which the moulds 2 advance towards the output station 10.

Concerning the moulds 2 that are used to achieve the vulcanisation of the mixture M, with reference to the aforementioned FIGS. 16 through 19, it is observed that each of them comprises a base 3 and a lid 4 superposed and distanced from the base 3.

The base 3 comprises a base plate 31 to which are fixed two lateral plates 32 that are mutually parallel, distanced and facing each other and each of which is arranged in a recessed position relative to the terminal edges 33 of the base plate 31.

In this way, in the base 3 are defined two lateral appendages 34 that project relative to the lateral plates 32.

Each lid 4 in turn comprises a planar plate 41 configured to be associated with the terminal edge 35 of the lateral plates 32 so as to define for the mould 2 an annular profile 21 delimited by the base 3 and by the lid 4 into which is received the vulcanisation mixture M.

Preferably but not necessarily, the base plate 31 of each base 3 and each planar plate 41 of each lid 4 are provided with pegs projecting towards the interior of the mould 2, respectively 3° and 4°, mutually alternating.

The lid 4 and the respective base 3 are mutually fastened by the aforesaid junction means 5 that comprise a pair of rods 51 slidably associable in corresponding holes that are drilled as through holes along each of the lateral plates 32 and through the base plate 31, in the region in which each lateral plate 32 is in contact with the base plate 31.

Obviously, in other embodiments the junction means may provide, in each of the lateral plates, for the presence of more than two rods.

With reference to the aforementioned FIGS. 16 through 22, it is observed that each rod 51, when it is coupled to the respective lateral plate 32, has a first end 52 comprising a cap 55 that projects from a first hole 36 drilled in the corresponding lateral plate 32 itself and is configured to be received in a second hole 42 drilled in the plate 41 that constitutes the lid 4. Moreover, each rod 51 also has a second end 53 that projects from the base plate 31.

Each cap 55 is superposed to an annular body 56 of greater diameter both than the diameter of the cap 55 and than the diameter of the second hole 42 of the lid 4 so that, when the lid 4 is coupled to the base 3, it is supported by the annular body 56 at the desired distance from the base 3.

The second ends 53 of the rods 51 of each lateral plate 32 projecting from the base plate 31 are mutually connected by a junction bracket 54 which, as shown in particular in FIG. 10, is received in guiding tracks 20 that develop parallel to each other along the plant 1 between the input station 9 and output station 10 when the first transport means 14 transfer the base 3 from the output station 10 to the input station 9, as shown in FIG. 10 and also in FIG. 4.

The junction bracket 54 is instead received in the shaped lanes 82 when the advancing means 7 push the bases 3 from the input station 9 to the output station 10, as shown in FIG. 10.

The shaped lanes 82 immediately upstream of the disassembly set 13 of the output station 10, as shown in FIG. 10, have a terminal segment 82a inclined upwards relative to the overlying planar lanes 81 on which the moulds 2 advance.

In this way, when the junction brackets 54 travel through the terminal segment 82a, the rods 51 are raised and the annular bodies 56 contrast against the planar plate 41 that constitutes the lid 4 and raise it from the base 3 that instead remains resting on the planar lanes 81.

Concerning the first displacement means 16, with reference to FIGS. 4 through 6 and 5a, it is observed that they comprise a pair of slides 161 that are associated to upright guides 121 belonging to the first frame 120 and that identify a vertical direction, indicated by the arrow Z, of displacement of the bases 3, orthogonal to the longitudinal direction X identified by the guiding means 8.

Figure 5A:
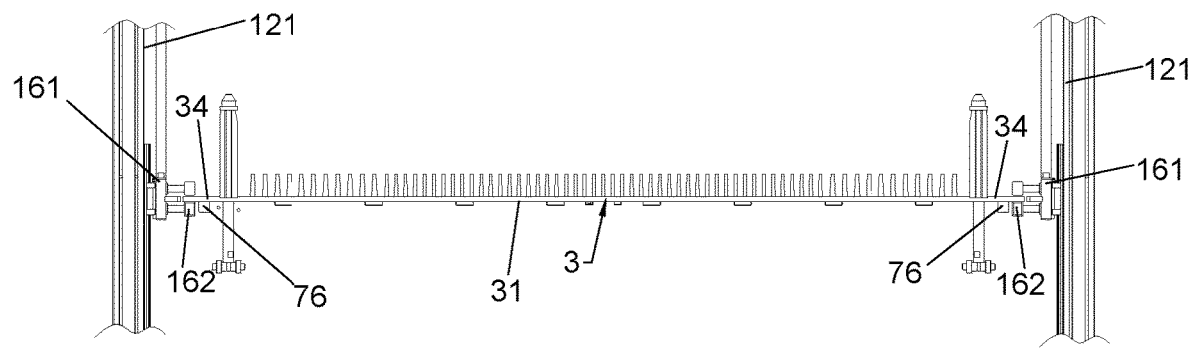
FIGS. 5a, 5b and 5c show different cross sections of FIG. 5.

Each slide 161 in turn comprises, with particular reference to FIGS. 6 and 5a, grip means 162 able to fasten each base 3 at the ends 34 and actuating means 163, preferably but not exclusively linear actuators, able to displace each of the slides 161 along the upright guides 121 according to the vertical direction Z to transfer one after the other each of the bases 3 from the first transport means 14 at the guiding means 8, as shown in FIG. 4.

Concerning the fourth displacement means 19, with reference to FIGS. 10 through 12 and 15, it is observed that they have substantially the same structure and the same mode of operation of the first displacement means 16 and comprise a pair of slides 191 that are associated to upright guides 131 belonging to the second frame 130 and that identify a vertical direction Z orthogonal to the longitudinal direction X identified by the guiding means 8.

Moreover, each of the slides 191 comprises grip means 192 that are able to fasten each of the bases 3 at the ends 34 and actuating means 193, preferably but not exclusively linear actuators, able to displace each of the slides 191 along the upright guides 131 according to the vertical direction Z to transfer one after the other each of the bases 3 from the guiding means 8 to the underlying first transport means 14.

Concerning the second displacement means 17, with reference to FIGS. 4, 5, 7 and 8, it is observed that they comprise a pair of movable frames 171 mutually parallel and distanced from each other, which support slidable slides 172 having grip means 173 for gripping the lids 4 and which are provided with first displacement members 174, preferably but not exclusively linear actuators, of the slidable slides 172 along the movable frames 171 in both ways of the vertical direction Z.

The second displacement means 17 also comprise two support brackets 175 of the movable frames 171 that support the first displacement members 174 and that are slidably associated to sliding guides 176 parallel and arranged side by side to each other that belong to the first frame 120 and that lie on a horizontal plane.

Moreover, the support brackets 175 are connected to second displacement members 177 that displace them, together with the movable frames 171 that they support, along the sliding guides 176 in both ways of the horizontal direction Y, orthogonally to the vertical direction Z and to the longitudinal direction X identified by the guiding means 8.

Figure 7:
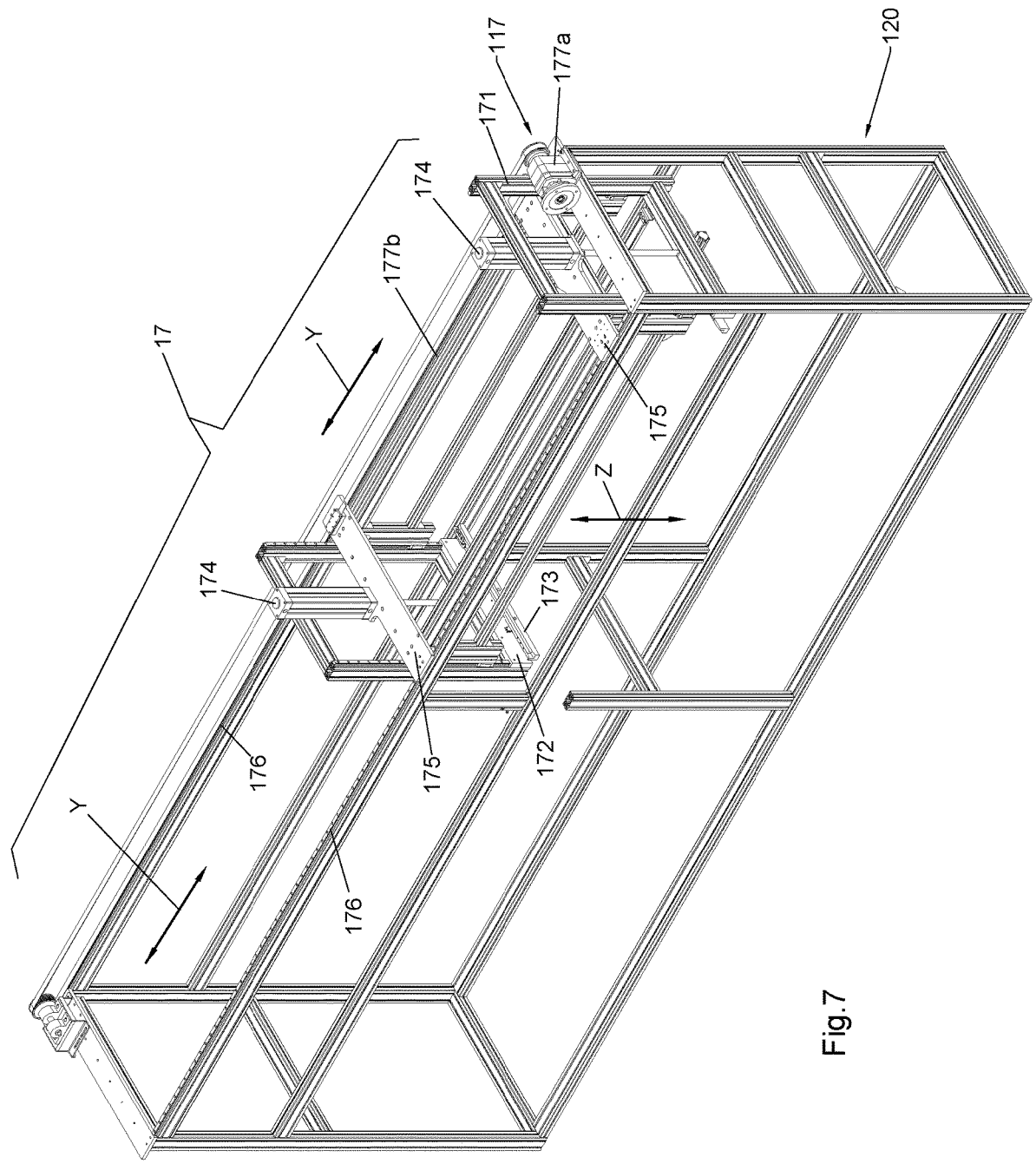
FIG. 7 is another enlarged detail of FIG. 5.
Figure 8:
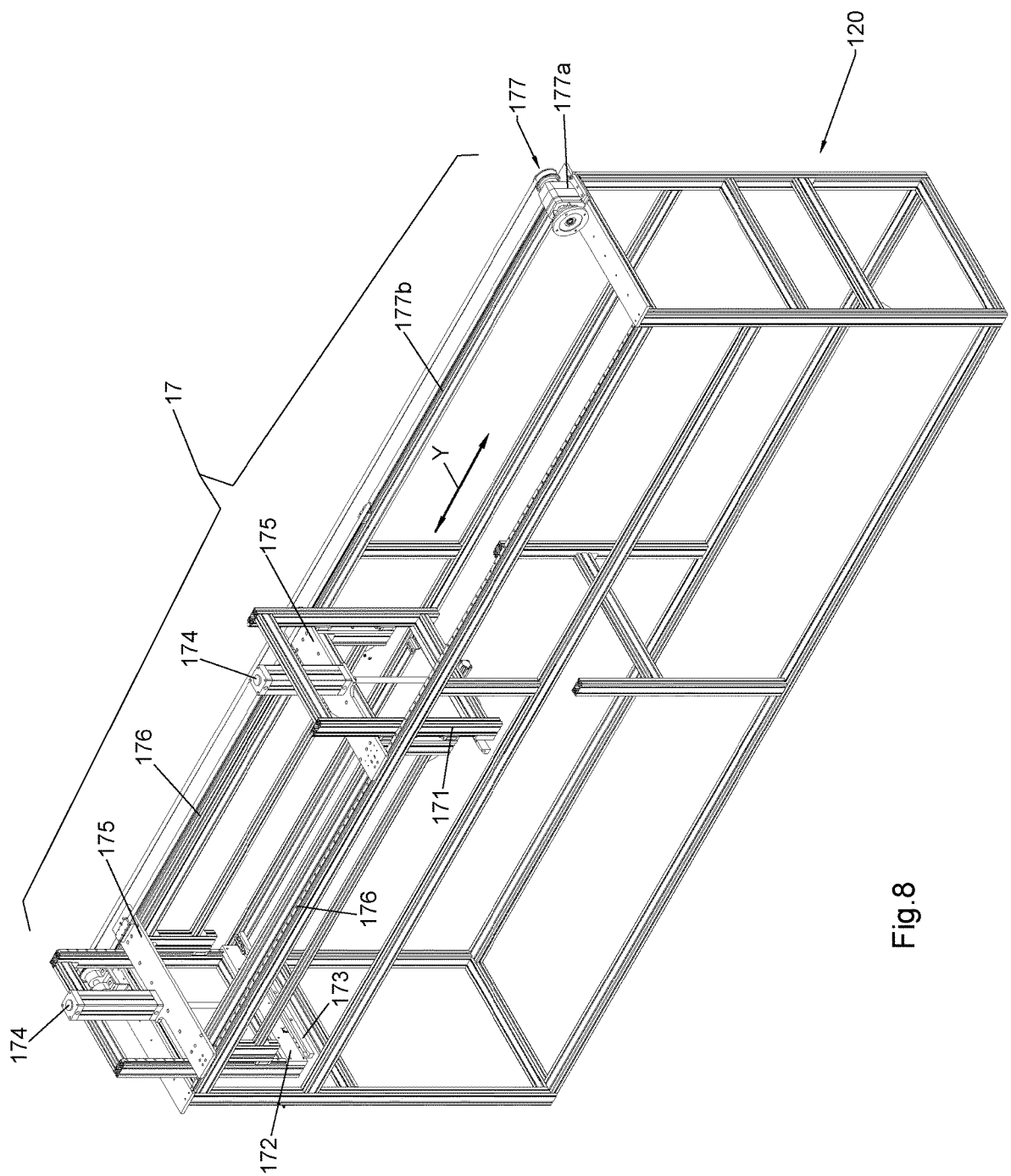
FIG. 8 shows the detail of FIG. 7 in a different operating configuration.

It is observed in particular in FIGS. 7 and 8 that the displacement members 177 comprise a gearmotor 177a that sets in motion in both ways of the horizontal direction Y a belt 177b to which both support brackets 175 are fixed.

In this way the lids 4 are translated from the position in which they are superposed to the second transport means 15 to the position in which they are superposed to the underlying bases 3 positioned on the guiding means 8.

Operatively, the second displacement members 177 transfer each lid 4 along the horizontal direction Y from the second transport means 15 to above an underlying base 3 present on the guiding means 8.

In this position the first displacement members 174 displace the lid 4 according to the vertical direction Z to couple it to the underlying base 3, as shown in FIG. 4.

Concerning the third displacement means 18, with reference to Figures from 10 to 14, it is observed that they are substantially equal to and perform substantially the same function of the second displacement means 17 and they comprise a pair of movable frames 181 mutually parallel and distanced from each other, which support slidable slides 182 having grip means 183 for gripping the lids 4 and which are provided with first displacement members 184, preferably but not exclusively linear actuators, of the slidable slides 182 along the movable frames 181 in both ways according to the vertical direction Z.

The third displacement means 18 also comprise support brackets 185 of the movable frames 181 that are slidably associated with sliding guides 186, mutually parallel and side by side, that belong to the first frame 130 and that lie on a horizontal plane.

Moreover, the support brackets 185 are connected to second displacement members 187 that displace the movable frames 181 along the sliding guides 186 in both ways along the horizontal direction Y orthogonal to the vertical direction Z and to the longitudinal direction X identified by the guiding means 8, to transfer the lids 4 drawn from the moulds 2 present on the guiding means 8 to the second transport means 15, and vice versa.

Operatively, the first displacement members 184 draw, according to the vertical direction Z, each of the lids 4 positioned above an underlying mould 3 present on the guiding means 8 and the second displacement members 187 transfer the lid 4 drawn according to the horizontal direction Y and position it on the second transport means 15, as shown in FIG. 11.

The operation of the plant 1 of the invention is described below with reference to the displacements that are imposed to a base 3 and to a lid 4 to assemble and disassemble a mould 2 and to the displacement that is imposed to the same mould 2 along the vulcanising oven 6 to carry out the vulcanisation of the product M positioned inside the mould 2.

Obviously, in operation in the input station 9 of the plant 1 a plurality of moulds 2, all identical, are assembled continuously one after the other and are then made to transit aligned close to each other along the vulcanising oven 6.

With equal continuity, at the output from the vulcanising oven 6 the moulds 2 are disassembled in the output station 10 where the vulcanised product, not shown in the figures, is drawn, which consists of a continuous layer of soft and elastically yielding material of indefinite length with its cross section reproducing the profile of the cavity 21 of the moulds 2.

Operatively, the operation of the plant starts from the configuration shown in FIG. 1a and in FIG. 1b in which a plurality of bases 3 are positioned aligned close to each other at the assembly set 12.

In this position, the spraying means 11 introduce the mixture M constituted by natural or synthetic latex into the bases 3 which are made to advance along the vulcanising oven 6 by the pushing action of the advancing means 7.

In particular, with reference to FIGS. 4, 5, 5a and 5b, the advance of the bases 3 is achieved by the actuators 71 that act by pushing against the base 3 positioned at the head of all the other bases 3 that are aligned to each other and by the gear wheels 74, set in rotation by the motorisation means 75, which mesh with the racks 76 associated with the bases 3.

When a base 3 reaches the second displacement means 17 as shown in FIG. 4, the second displacement members 177 displace the support brackets 175 and hence the movable frames 171 associated therewith according to the horizontal direction Y along the sliding guides 176 until arranging them in the configuration of FIG. 8 at the second transport means 15, where the grip means 173 with which they are provided draw a lid 4 present thereon.

It should be noted that the movable frames 171 and the grip means 173 can be so dimensioned as to draw one or more lids arranged mutually side by side.

After drawing one or more lids 4, the second displacement members 177 reverse the movement of the support brackets 175 and displace the movable frames 171 in horizontal direction Y but opposite relative to the previous one, until displacing the movable frames 171 in the configuration of FIG. 7 to position the lid or the lids 4 above the underlying base or bases 3, as shown in FIG. 4.

In this position, the first displacement members 174 associated with the movable frames 171 displace the slidable slides 172 that support the grip means 173 according to the vertical direction Z and towards the underlying base or bases 3, until coupling the lids 4 to each other.

The connection between each base 3 and the respective lid 4 takes place by the already described junction means 5 so as to complete the mould 2 that in the inner cavity 21 contains the mixture M to be vulcanised.

Obviously, present in the plant are control sensors connected to a control unit managed by a dedicated software for the synchronisation and control of all the described operations.

When the mould 2 is assembled, due to the pushing action of the advancing means 7 it enters the vulcanising oven 6 where the two radiofrequency sets 62 vulcanise the mixture M.

The vulcanising oven 6 comprises two radiofrequency sets 62, but in another embodiment the plant can comprise a vulcanising oven provided with any number of radiofrequency sets.

Figure 5B:
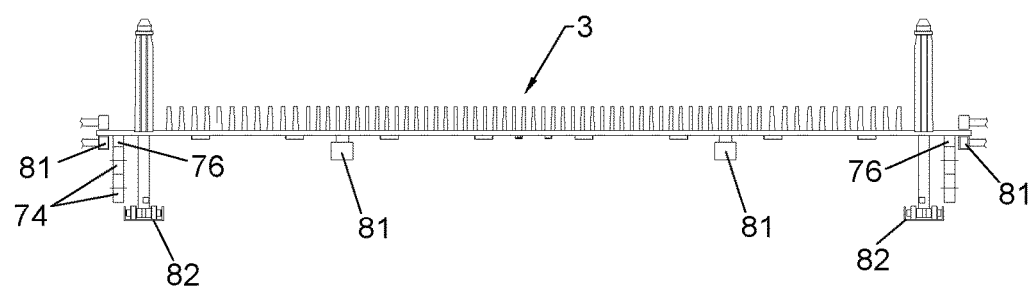
Figure 5C:
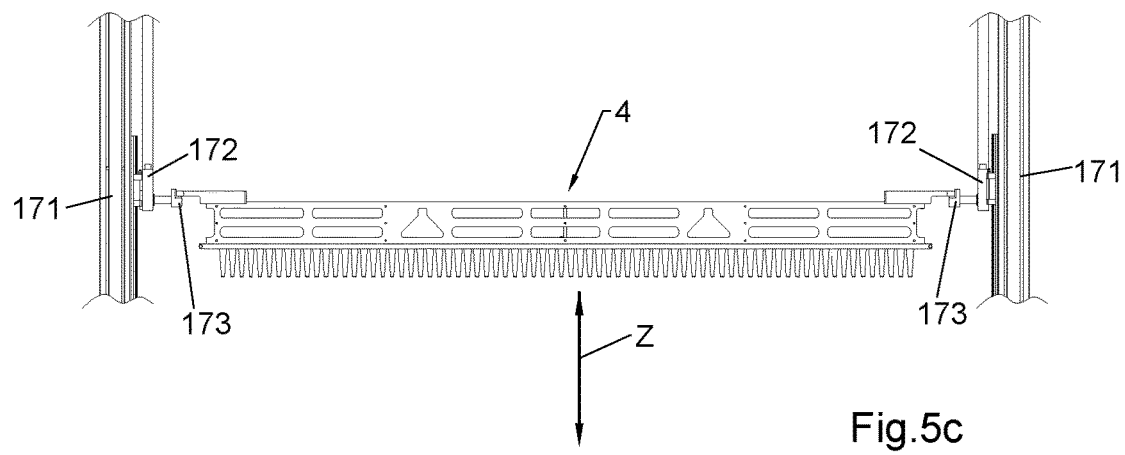

During the travel of the bases 3 along the input station 9 and of the mould 2 along the vulcanising oven 6, the junction brackets 54 that connect to each other the second ends 53 of the rods 51 of the junction means 5 are slidably received inside the shaped lanes 82, as shown in FIGS. 5a, 5b and 10.

When the mould 2 reaches the output of the vulcanising oven 6 as shown in FIG. 10, while the base 3 continues its motion being supported by the planar lanes 81, the junction brackets 54 of the rods 51 meet the terminal segment 82a of the shaped lanes 82, as shown in FIG. 12.

Figure 15:
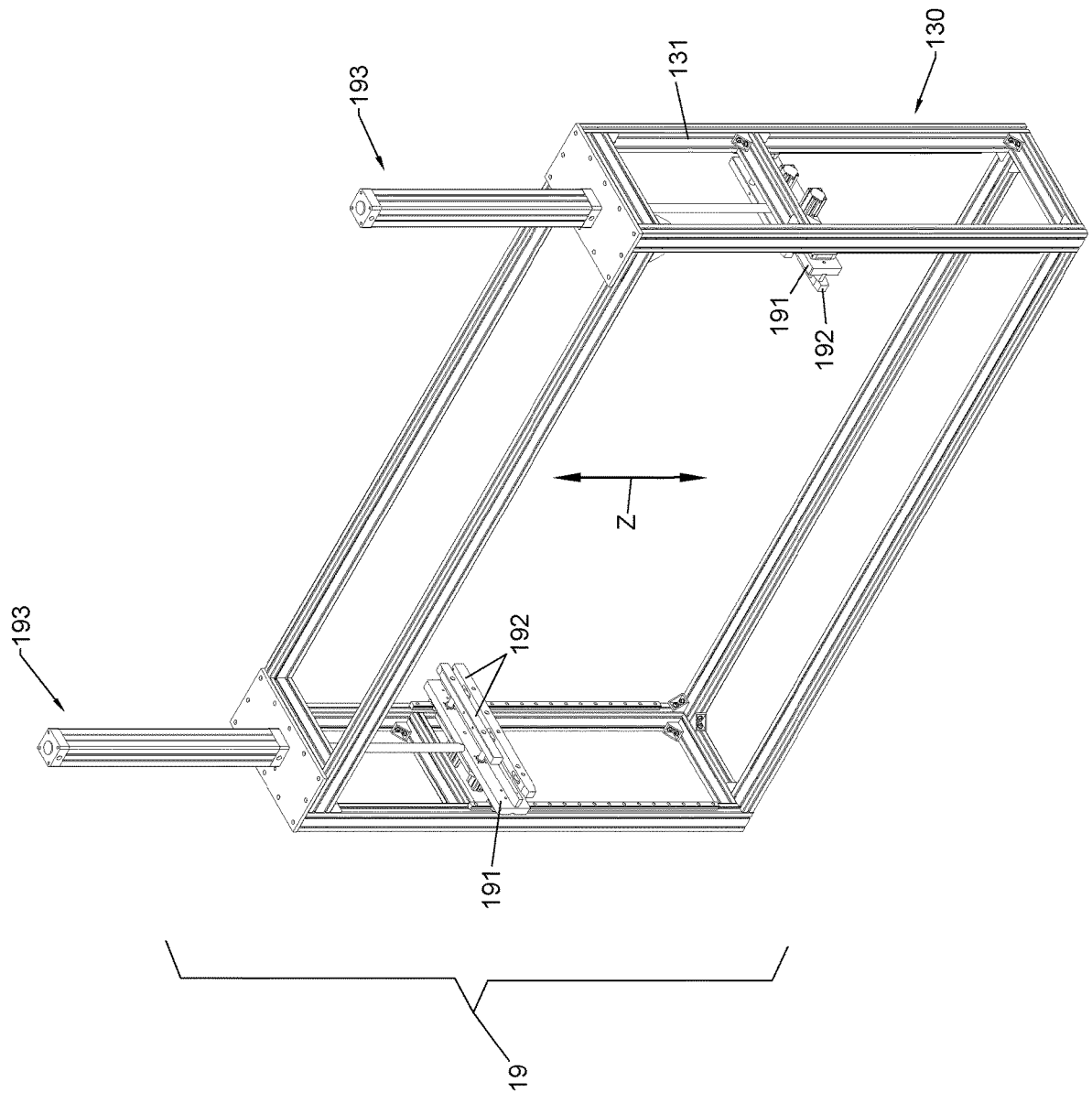
FIG. 15 is another enlarged detail of FIG. 10.
Figure 16:
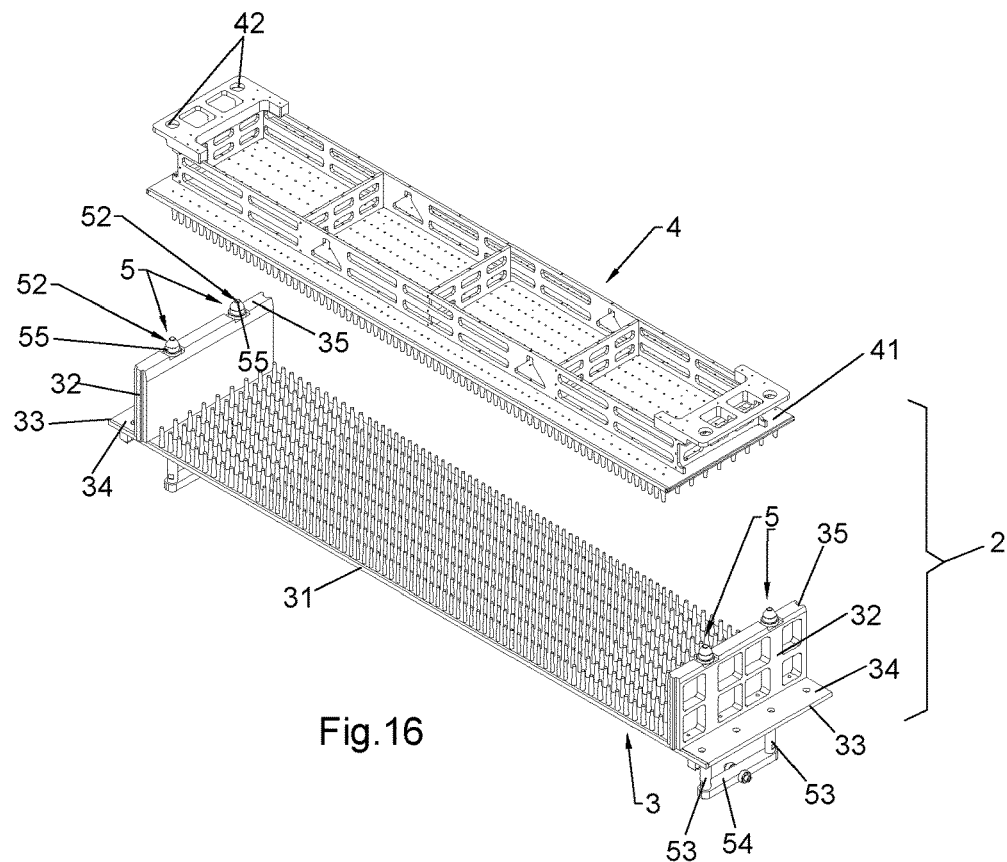
FIGS. 16 through 22 show elements that compose the moulds, arranged in different configurations, assembled and not assembled.
Figure 17:
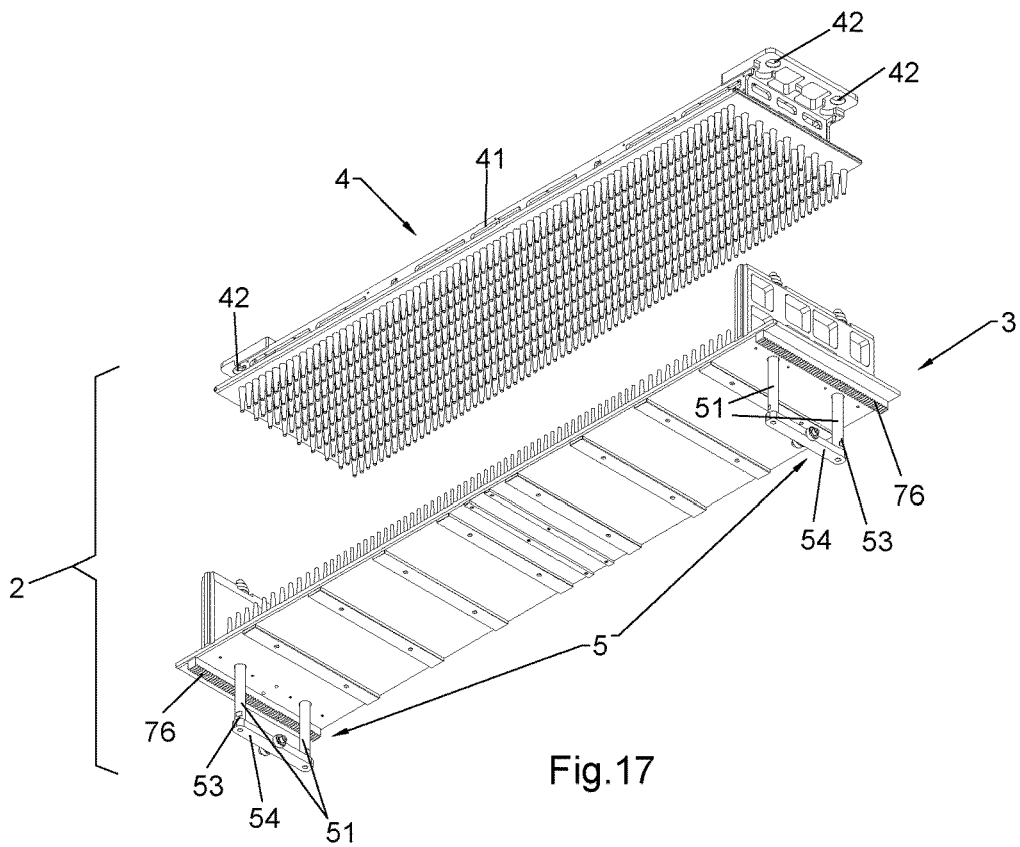

This causes the progressive lifting of the lid 4 from the base 3 to the position of maximum lift shown in FIG. 15, when the mould 2 is received in the disassembly set 13 at the third displacement means 18.

In this position, the first displacement means 184 cause the sliding of the slidable slides 182 according to the vertical direction Z and downwards along the movable frames 181, until placing the grip means 183 in a position adapted to fasten the lid 4 at the ends.

The direction of motion of the first displacement means 184 is then reversed, which causes the lifting of the slidable slides 182 and of the lid 4 in the vertical direction Z and opposite to the previous one, until placing the lid 4 in parallel position to the second transport means 15.

From this position, the second displacement members 187 displace the movable frames 181 according to the horizontal direction Y until placing the lid 4 to bear on the conveyor belts 151 of the second transport means 15, as shown in FIG. 11, where the grip means 183 release it.

When the motorisation means 153 set in motion the conveyor belts 151, the lid 4 returns to the assembly set 12 for the transport action of the conveyor belts 151 that move horizontally in the direction indicated by the arrow X' in FIG. 12.

In the meantime the base 3, freed from the overlying lid 4, continues its movement until reaching the fourth displacement means 19, as shown in FIG. 11, where it is taken by the grip means 192 of the slides 191 associated with the upright guides 131 of the second frame 130, also shown in FIG. 12.

The actuating means 193 then displace the slides 191 along the upright guides 131 in vertical direction Z downwards and transfer the base 3 from the guiding means 8 to the underlying first transport means 14 where it is placed to bear on the first conveyor belts 141, as shown in FIG. 11.

The activation of the motorisation means 143 causes the displacement of the first conveyor belts 141 in the horizontal direction towards the assembly set 12 as indicated by the arrow X' in FIG. 11 so as to transport the base 3 in the assembly set 12 and in particular at the first displacement means 16.

At the first displacement means 16 the base 3 is taken by the grip means 162 of the slides 161 that are associated with uprights guides 121 and that belong to the first frame 120 of the first displacement means 16.

In this situation, the actuating means 163 displace the slides 161 along the upright guides 121 according to the vertical direction Z and upwards and transfer the base 3 from the first conveyor belts 141 of the first transport means 14 to the guiding means 8.

In this situation, the action of the advancing means 7 causes the base 3 to advance along the planar lanes 81 of the guiding means 8 to the second displacement means 17 where the operation of assembling a new mould 2 is repeated.

As already stated, for the plant to carry out the continuous vulcanisation it is necessary for the operations described above of assembling and disassembling each mould to be carried out repetitively and continuously.

In this way, along the tunnel 61 of the vulcanising oven 6 will always be present moulds 2 arranged aligned next to each other so as to constitute a continuous tubular element within which takes place the vulcanisation of the material M that was sprayed inside the bases 3 at the assembly set 2.

The plant is also provided with means that allow to change the thickness of the continuous layer of vulcanised material M that exits the tunnel 61 of the vulcanising oven 6.

Figure 2:
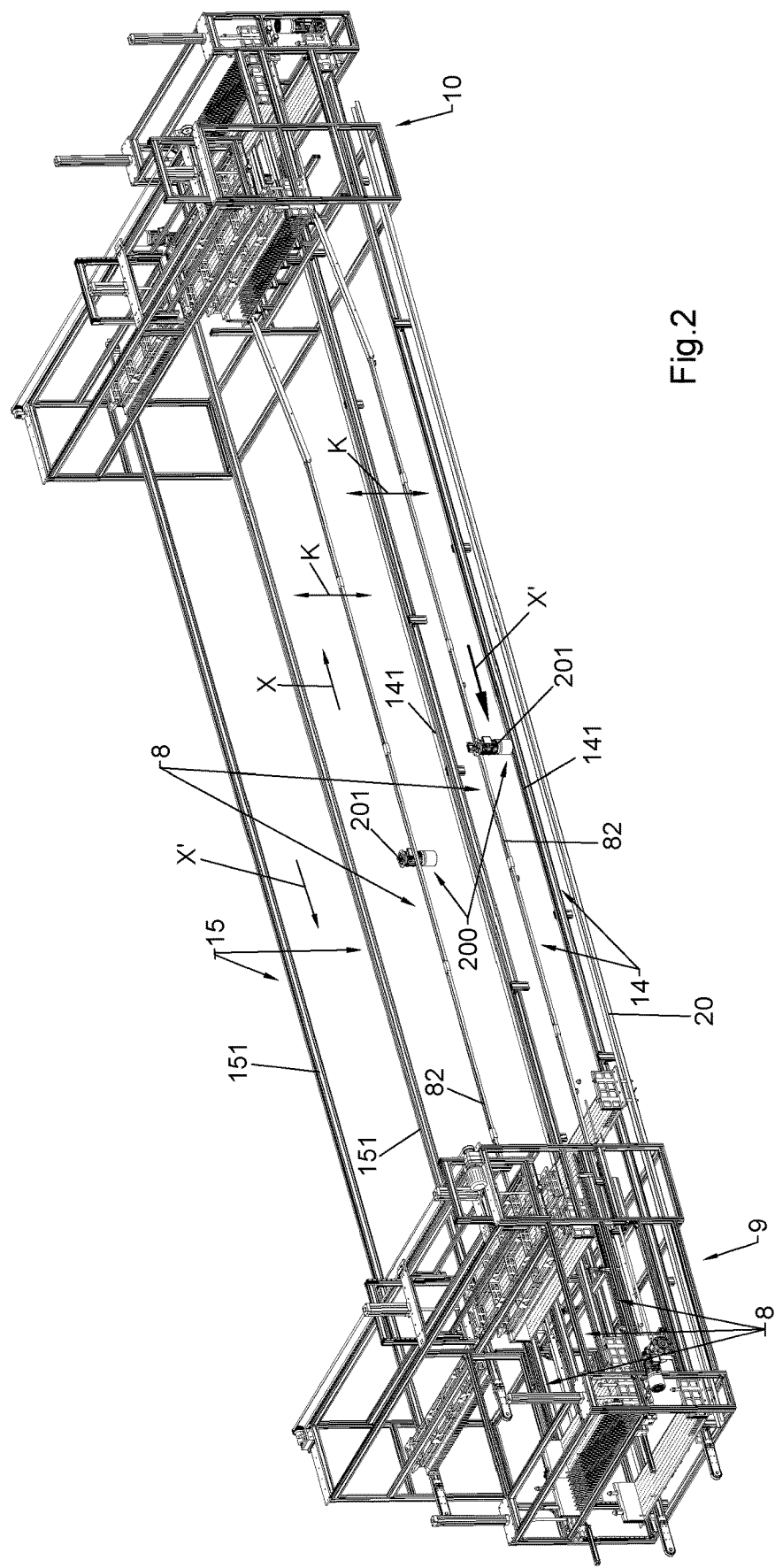
FIG. 2 shows a portion of the plant of FIG. 1.
Figure 3:
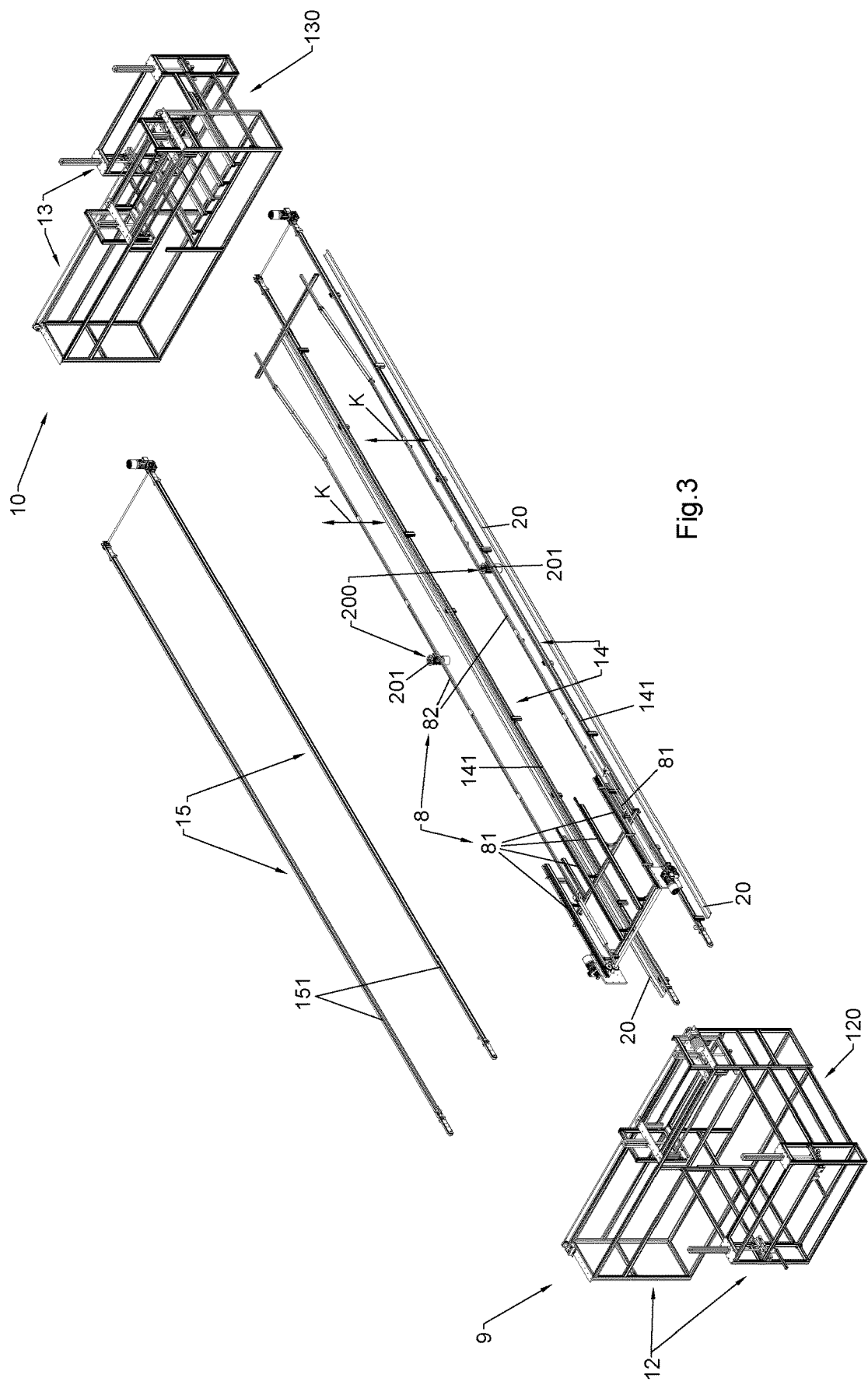
FIG. 3 shows an exploded view of the plant of FIG. 2.

For this purpose, the plant is provided with one or more motorisation sets, one of which is particularly visible in FIGS. 2 and 3 where it is designated in its entirety with the number 200.

Each motorisation set 200 comprises gearmotors 201 that set in motion linkage means, not shown in the figures, for raising and lowering the shaped lanes 82 in the vertical direction K.

It is observed that this movement of the shaped lanes 82 is allowed by the fact that they, as shown in particular in the enlargement of FIG. 10, are connected to their terminal segment 82a by means of hinges 82c.

Figure 18:
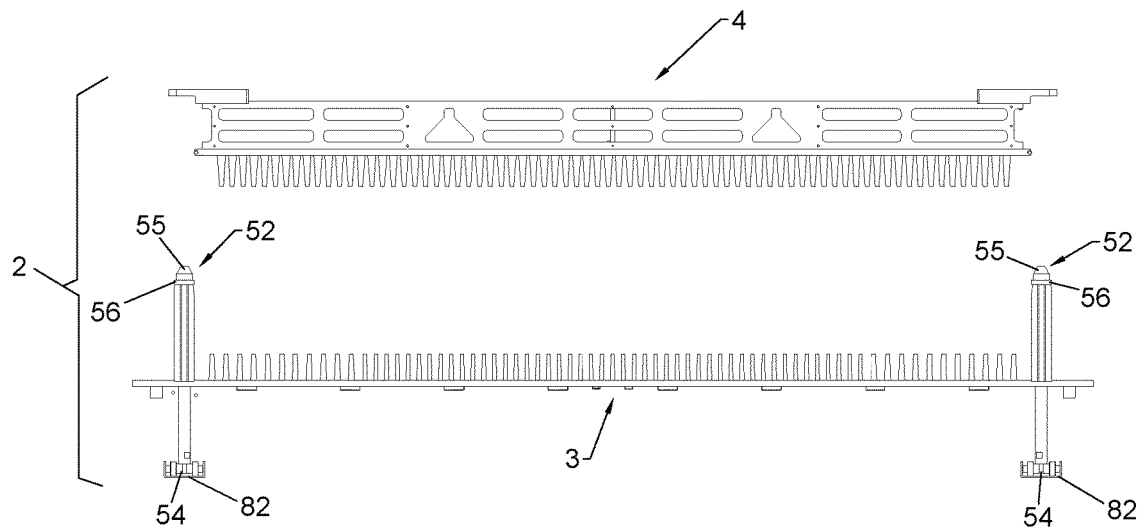
Figure 19:
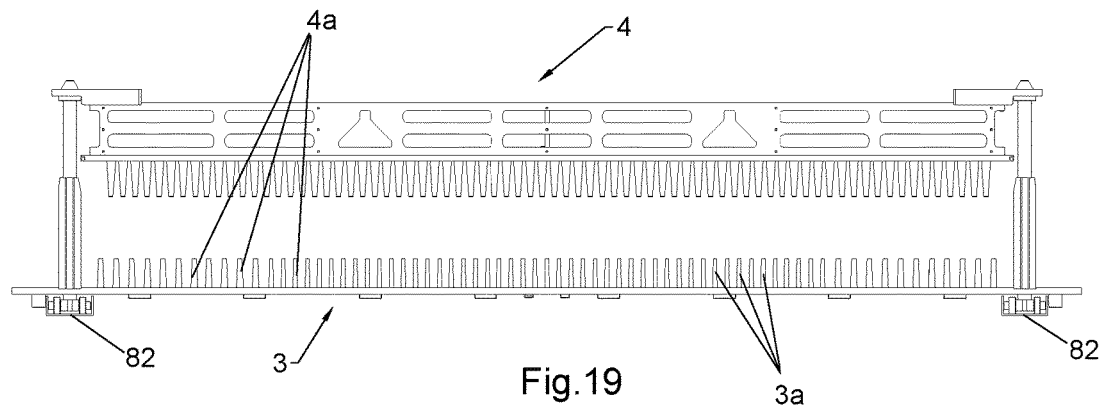
Figure 20:
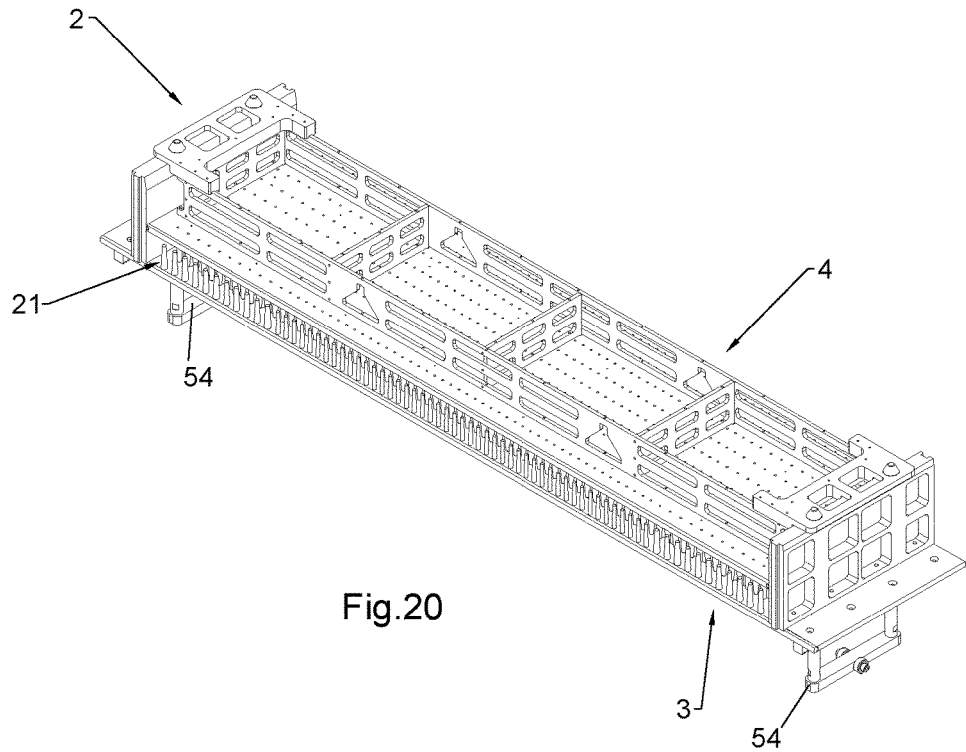

Therefore, by changing the position of the shaped lanes 82 in which slide the junction brackets 54 of the junction means 5 as shown in FIGS. 5b, 18 and 19, it is possible to change the position of their rods 51 and hence to place the lid 4 which the rods 51 support in different positions with respect to the underlying base 3.

In particular in FIG. 19 are shown the shaped lanes 82 in the position of maximum lifting in which the lid 4 is placed at the maximum distance from the underlying base 3 so as to obtain a vulcanised layer of maximum thickness.

Figure 21:
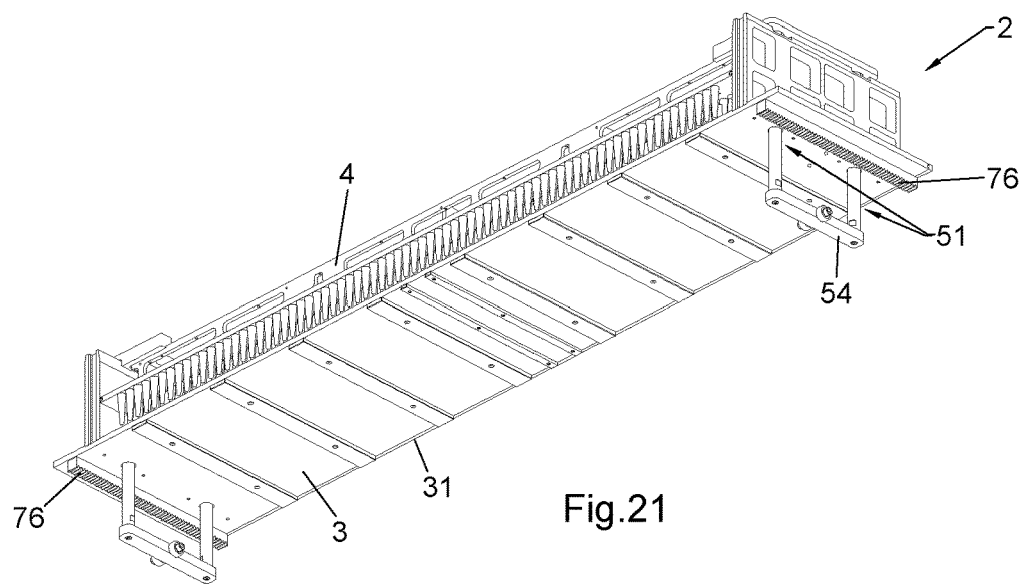
Figure 22:
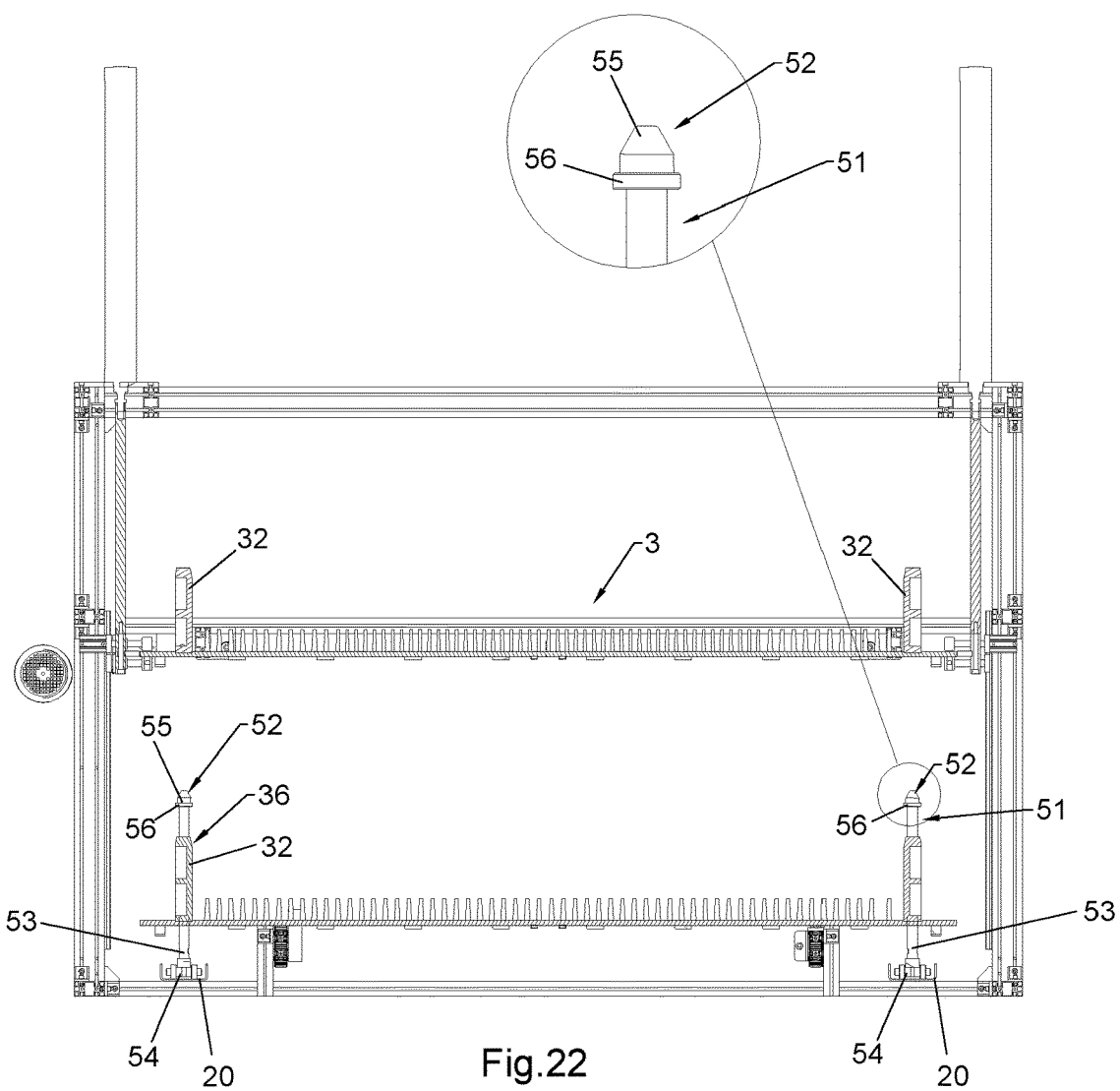

Vice versa, in FIGS. 5b and 18 the shaped lanes 82 are placed in their position of maximum lowering in which the lid 4, not shown in these figures, is in the configuration shown in FIG. 21 and hence at the minimum distance from the underlying base 3 so as to obtain a vulcanised layer of minimum thickness.

Obviously, by activating the motorisation set 200 it is possible to place the shaped lanes 82 in intermediate positions between the two extreme positions described to obtain vulcanised layers of different thicknesses.

Given the above, the plant of the invention, with respect to prior art plants equivalent thereto, has less construction complexity because the main movements of the bases 3, of the lids 4 and of the moulds 2 are obtained by linear actuators that are easy to install.

Hence, the linkages for advancing the moulds formed by linkages comprising gear wheels and chains are totally eliminated and this allows to attain high operating reliability of the plant.

Moreover, the advance of the moulds takes place by thrust generated by the advancing means and not by the traction produced by catenary means associated with sprockets, as in the prior art, that are subject to wear.

This entails the advantage that no plays due to wear emerge with use.

Moreover, any plays between the moulds which, if present, cause on the vulcanised finished product the defects stated in the introductory part are always eliminated by the thrust with which the advancing means mutually force the moulds that are aligned close to each other.

The plant of the invention, using radiofrequency heating means, also achieves the purpose of reducing both the construction costs, and the operating costs of the plant itself, with respect to prior art plants and particularly with respect to plants that use steam heating.

Advantageously, the plant of the invention then has features that enable it to manufacture qualitatively better vulcanised products at a lower price with respect to similar vulcanised products obtained with prior art plants.

In the execution phase, to the plant of the invention may be made changes and executive variants not described and not illustrated in the accompanying drawings, useful to improve its operation or to reduce its construction costs.

It is understood that, if these changes and variants should be within the scope of the claims that follow, they shall definitely be deemed protected by the present patent.

The invention claimed is:

1. A plant for the continuous vulcanisation of mixtures of natural or synthetic latex comprising:
    a plurality of vulcanisation moulds that are aligned close to each other, each comprising a base and a lid that can be removably coupled to each other by junction means and configured so as to define in said mould an annular profile that receives the mixture to be vulcanised;
    a vulcanising oven of the mixture confined inside said moulds;
    an input station positioned upstream of said vulcanising oven and an output station positioned downstream of said vulcanising oven;

guiding means that develop along said vulcanising oven from said input station to said output station and that identify the longitudinal direction of advance of said bases and of said moulds from said input station to said output station;

advancing means for advancing said bases and said moulds along said guiding means from said input station to said output station;

spraying means for spraying said mixture into said bases when said bases are present in said input station and are positioned along said guiding means, mutually aligned close to each other;

an assembly set for assembling said moulds that belongs to said input station and is configured to connect each lid to a corresponding base;

a disassembly set for disassembling said moulds that belongs to said output station and is configured to separate each lid from the corresponding base;

first transport means configured to transfer each of said bases from said disassembly set to said assembly set;

second transport means configured to transfer each of said lids from said disassembly set to said assembly set, said vulcanising oven comprising a tunnel having at least one radiofrequency set for vulcanising said mixture.

2. The plant according to claim 1, wherein said assembly set comprises a first frame to which are associated:

first displacement means configured to draw each of said bases from said first transport means and place said base aligned to said guiding means;

second displacement means configured to draw each of said lids from said second transport means and coupling said lid to said underlying base to compose said mould;

said advancing means for advancing said bases and said moulds along said guiding means, said first displacement means being positioned upstream of said second displacement means according to the direction of advance of said bases and of said moulds along said guiding means according to said longitudinal direction.

3. The plant according to claim 2, wherein said advancing means comprise:

a pair of linear actuators supported by said first frame, positioned upstream of said guiding means and each comprising a cylinder fixed to said frame and the end of the stem placed in contact with a respective base when said base is present at said first displacement means;

a pair of gear wheels supported by said first frame and positioned downstream of said linear actuators, each of said pairs of gear wheels being positioned at one of said planar lanes and being set in rotation by motorisation means fixed to said frame;

a pair of racks, each being fixed to each of said bases to mesh with a corresponding one of said gear wheels when said linear actuators displace said base towards said second displacement means.

4. The plant according to claim 2, wherein said first displacement means comprise a pair of slides associated to upright guides belonging to said first frame which identify a vertical direction orthogonal to the longitudinal direction identified by said guiding means, each of said slides comprising grip means able to fasten each of said bases at the ends and actuating means able to displace each of said slides along said upright guides according to said vertical direction to transfer one after the other each of said bases from said first transport means to said guiding means.

5. The plant according to claim 4, wherein said second displacement means comprise:

a pair of movable frames parallel to and distanced from each other that support slidable slides having grip means of said lids and that are provided with first displacement members of said slidable slides along said movable frames according to said vertical direction;

support brackets of said movable frames slidably associated with sliding guides mutually parallel and set side by side belonging to said first frame and connected to second displacement members of said movable frames from said second transport means to said guiding means, and vice versa, according to a horizontal direction orthogonal to said vertical direction and to said longitudinal direction identified by said guiding means, said second displacement members being able to transfer along said horizontal direction each of said lids one after the other from said second transport means to said guiding means and above an underlying base present on said guiding means and said first displacement members being able to displace said slidable slides along said movable frames according to said vertical direction to couple said lid to said underlying base.

6. The plant according to claim 2, wherein said second displacement means comprise:

a pair of movable frames parallel to and distanced from each other that support slidable slides having grip means of said lids and that are provided with first displacement members of said slidable slides along said movable frames according to said vertical direction;

support brackets of said movable frames slidably associated with sliding guides mutually parallel and set side by side belonging to said first frame and connected to second displacement members of said movable frames from said second transport means to said guiding means and vice versa, according to a horizontal direction orthogonal to said vertical direction and to said longitudinal direction identified by said guiding means, said second displacement members being able to transfer along said horizontal direction each of said lids one after the other from said second transport means to said guiding means and above an underlying base present on said guiding means and said first displacement members being able to displace said slidable slides along said movable frames according to said vertical direction to couple said lid to said underlying base.

7. The plant according to claim 1, wherein said disassembly set comprises a second frame with which are associated:

third displacement means configured to separate each of said lids from the underlying base and place said lid on said second transport means;

fourth displacement means configured to draw each of said bases from said guiding means and place said base on said second transport means, said fourth displacement means being positioned downstream of said third displacement means according to the direction of advance of said bases and of said moulds along said guiding means according to said longitudinal direction.

8. The plant according to claim 7, wherein said fourth displacement means comprise a pair of slides associated with upright guides belonging to said second frame that identify a vertical direction orthogonal to the longitudinal direction identified by said guiding means, each of said slides comprising grip means able to fasten each of said bases at the ends and actuating means able to displace each of said slides along said upright guides according to said vertical direction to transfer one after the other each of said bases from said guiding means to said first transport means.

9. The plant according to claim 8, wherein said third displacement means comprise:
- a pair of movable frames parallel to and distanced from each other that support slidable slides having grip means of said lids and that are provided with first displacement members of said slidable slides along said movable frames according to said vertical direction;
- support brackets of said movable frames slidably associated with sliding guides mutually parallel and set side by side belonging to said first frame and connected to second displacement members of said movable frames from said guiding means to said second transport means, and vice versa, according to said horizontal direction orthogonal to said vertical direction and to said longitudinal direction identified by said guiding means, said first displacement members being able to draw according to said vertical direction each of said lids positioned above an underlying base present on said guiding means and said second displacement members being able to displace said movable frames along said sliding guides according to said horizontal direction to displace said lid on said second transport means.

10. The plant according to claim 7, wherein said third displacement means comprise:
- a pair of movable frames parallel to and distanced from each other that support slidable slides having grip means of said lids and that are provided with first displacement members of said slidable slides along said movable frames according to said vertical direction;
- support brackets of said movable frames slidably associated with sliding guides mutually parallel and set side by side belonging to said first frame and connected to second displacement members of said movable frames from said guiding means to said second transport means, and vice versa, according to said horizontal direction orthogonal to said vertical direction and to said longitudinal direction identified by said guiding means, said first displacement members being able to draw according to said vertical direction each of said lids positioned above an underlying base present on said guiding means and said second displacement members being able to displace said movable frames along said sliding guides according to said horizontal direction to displace said lid on said second transport means.

11. The plant according to claim 1, wherein said guiding means comprise planar lanes and shaped lanes parallel to and distanced from each other which extend from said input station to said output station being arranged on two mutually parallel planes wherein the plane on which said planar lanes lie is positioned above and distanced from the plane on which said shaped lanes lie, said planar lanes being able to support said bases and said moulds when said advancing means exercise a pushing action on the base positioned at the head of a plurality of bases aligned along said planar lanes and placed close to each other and said shaped lanes having, upstream of said disassembly set, a terminal segment inclined upwards.

12. The plant according to claim 11, further comprising one or more motorisation sets each comprising at least one gearmotor able to set in motion linkage means for the displacement of said shaped lanes according to the vertical direction.

13. The plant according to claim 1, wherein said first transport means comprise a pair of first conveyor belts mutually parallel, distanced and lying on a plane positioned inferiorly to the plane on which said guiding means lie, each of said first conveyor belts being wound in a loop between at least a pair of pulleys one or more of which is set in rotation by motorisation means, said first conveyor belts being configured to transport said bases from said disassembly set in said assembly set.

14. The plant according to claim 1, wherein said second transport means comprise a pair of second conveyor belts mutually parallel, distanced and lying on a plane positioned laterally to said guiding means, each of said second conveyor belts being wound in a loop between at least a pair of pulleys one or more of which is set in rotation by motorisation means, said second conveyor belts being configured to transport said lids from said disassembly set in said assembly set.

15. The plant according to claim 1, wherein each of said moulds comprises:
- said base which comprises a base plate and two lateral plates mutually parallel, distanced and facing each other which are fixed orthogonally to said base plate each in recessed position with respect to the terminal edges of said base plate to define in said base two lateral appendages projecting orthogonally with respect to said lateral plates;
- said lid which comprises a planar plate configured to be associated with the terminal edge of said lateral plates so as to define for said mould said annular profile in which said mixture to be vulcanised is received, when said lid and said base are mutually fastened by said junction means.

16. The plant according to claim 15, wherein said junction means comprise two or more rods slidably associable in corresponding holes that are drilled as through holes along each of said lateral plates and through said base plate in the region in which said each lateral plate is in contact with said base plate, each of said rods having:
- a first end projecting from a first hole thilled in said lateral plate and configured to be coupled in a second hole drilled in said plate of said lid;
- a second end projecting from said base plate and configured to be received in a guiding track that develops from said input station to said output station.

17. The plant according to claim 16, wherein said second ends of said rods are mutually connected by a junction bracket configured to be received in said guiding track.

18. The plant according to claim 16, wherein said first end of each of said rods comprises a shaped cap configured to be received in said second hole and superposed to an annular body having greater diameter than the diameter of said shaped cap and than the diameter of said second hole.

* * * * *